(12) United States Patent
Tadi et al.

(10) Patent No.: US 11,367,198 B2
(45) Date of Patent: Jun. 21, 2022

(54) SYSTEMS, METHODS, AND APPARATUSES FOR TRACKING A BODY OR PORTIONS THEREOF

(71) Applicant: MindMaze Holdiing SA, Lausanne (CH)

(72) Inventors: Tej Tadi, Lausanne (CH); Nicolas Fremaux, Lausanne (CH); Jose Rubio, Lausanne (CH); Jonas Ostlund, Lausanne (CH); Max Jeanneret, Lausanne (CH)

(73) Assignee: MindMaze Holding SA, Lausanne (CH)

( * ) Notice: Subject to any disclaimer, the term of this patent is extended or adjusted under 35 U.S.C. 154(b) by 0 days.

(21) Appl. No.: 16/524,085

(22) Filed: Jul. 28, 2019

(65) Prior Publication Data

US 2020/0193614 A1    Jun. 18, 2020

Related U.S. Application Data

(63) Continuation-in-part of application No. PCT/IB2018/000171, filed on Feb. 7, 2018.
(Continued)

(51) Int. Cl.
| | | |
|---|---|---|
| G06K 9/00 | (2022.01) | |
| G06T 7/20 | (2017.01) | |
| G06T 7/70 | (2017.01) | |
| G06T 7/55 | (2017.01) | |
| G06T 17/20 | (2006.01) | |

(Continued)

(52) U.S. Cl.
CPC .............. G06T 7/20 (2013.01); G06F 3/011 (2013.01); G06F 3/017 (2013.01); G06N 7/005 (2013.01); G06T 7/55 (2017.01); G06T 7/70 (2017.01); G06T 17/205 (2013.01); G06T 19/20 (2013.01); G06T 2207/20076 (2013.01);
(Continued)

(58) Field of Classification Search
CPC .... G06T 7/20; G06T 7/55; G06T 7/70; G06T 17/205; G06T 19/20; G06F 3/011; G06F 3/017; G06N 7/005
USPC ....................................................... 382/100
See application file for complete search history.

(56) References Cited

U.S. PATENT DOCUMENTS

| | | | |
|---|---|---|---|
| 2008/0181507 A1* | 7/2008 | Gope ...................... | G06T 7/194 382/190 |
| 2010/0156935 A1* | 6/2010 | Lim ........................ | G06T 13/40 345/647 |

(Continued)

*Primary Examiner* — Stephen P Coleman
(74) *Attorney, Agent, or Firm* — Graeser Associates International Inc.; D'vorah Graeser

(57) ABSTRACT

Systems, methods and apparatuses for tracking at least a portion of a body by fitting data points received from a depth sensor and/or other sensors and/or "markers" as described herein to a body model. For example, in some embodiments, certain of such data points are identified as "super points," and apportioned greater weight as compared to other points. Such super points can be obtained from objects attached to the body, including, but not limited to, active markers that provide a detectable signal, or a passive object, including, without limitation, headgear or a mask (for example for VR (virtual reality)), or a smart watch. Such super points may also be obtained from specific data points that are matched to the model, such as data points that are matched to vertices that correspond to joints in the model.

35 Claims, 28 Drawing Sheets

Related U.S. Application Data

(60) Provisional application No. 62/715,671, filed on Aug. 7, 2018, provisional application No. 62/527,129, filed on Jun. 30, 2017, provisional application No. 62/456,025, filed on Feb. 7, 2017.

(51) Int. Cl.
*G06T 19/20* (2011.01)
*G06F 3/01* (2006.01)
*G06N 7/00* (2006.01)

(52) U.S. Cl.
CPC ............. *G06T 2207/20212* (2013.01); *G06T 2207/30196* (2013.01); *G06T 2219/2004* (2013.01)

(56) References Cited

U.S. PATENT DOCUMENTS

| | | | |
|---|---|---|---|
| 2011/0181601 A1* | 7/2011 | Mumbauer | G06F 3/011 345/473 |
| 2013/0314401 A1* | 11/2013 | Engle | G06K 9/46 345/419 |
| 2015/0178988 A1* | 6/2015 | Montserrat Mora | G06T 13/40 345/420 |
| 2015/0213646 A1* | 7/2015 | Ma | G06T 7/50 345/420 |
| 2017/0140578 A1* | 5/2017 | Xiao | G06T 3/4038 |

* cited by examiner

SYSTEMS, METHODS, AND APPARATUSES FOR TRACKING A BODY OR PORTIONS THEREOF

FIELD OF THE DISCLOSURE

The present invention is of a system, method and apparatus for tracking a body or portions thereof, and in particular, to such a system, method and apparatus for performing such tracking with a depth sensor and/or camera.

BACKGROUND

A body of a subject that is in motion may be considered to change shape and position; it may be considered to change shape because of changing of the overall outline of the body. The prior art attempts to determine shape and position either via explicit point correspondences or using a deformation model as part of a Gaussian Mixture Model (GMM). For example, U.S. Pat. No. 8,724,906 describes shape and position of a moving body determined by applying a mesh to a model of the body, and then attempting to fit data points to the mesh by using a random walk classifier; and U.S. Pat. No. 9,344,707 describes fitting such data points but by searching for a global minima for matching the data points to points on a model. An example of a GMM is disclosed in "Real-time Simultaneous Pose and Shape Estimation for Articulated Objects Using a Single Depth Camera" by Mao Ye and Ruigang Yang, *IEEE Transactions on Pattern Analysis & Machine Intelligence,* 2016, vol. 38, Issue No. 08.

SUMMARY OF AT LEAST THE INVENTION

Embodiments of the present disclosure are directed to systems, methods and apparatuses for tracking at least a portion of a body by fitting data points received from a depth sensor and/or other sensors and/or "markers" as described herein to a body model. For example, in some embodiments, certain of such data points are identified as "super points," and apportioned greater weight as compared to other points. Such super points can be obtained from objects attached to the body, including, but not limited to, active markers that provide a detectable signal, or a passive object, including, without limitation, headgear or a mask (for example for VR (virtual reality)), or a smart watch. Such super points may also be obtained from specific data points that are matched to the model, such as data points that are matched to vertices that correspond to joints in the model.

According to at least some embodiments, there is provided a system for tracking at least a portion of a body, comprising: a depth sensor for providing data to determine the three-dimensional location of the body in space according to a distance of the body from the depth sensor; a body model, comprising a skeleton; and a computational device having computer instructions operating thereon configured to fit data points from the depth sensor to the body model according to a probabilistic fitting algorithm, wherein a plurality of data points is identified as super points and are given additional weight in the fitting algorithm; said super points are defined according to an object attached to the body, the data points are identified with joints of the body or a combination thereof, and said probabilistic fitting algorithm is constrained according to at least one constraint defined by the body.

Optionally said computational device comprises a hardware processor configured to perform a defined set of basic operations in response to receiving a corresponding basic instruction selected from a defined native instruction set of codes; and memory; wherein said computer instructions comprise a first set of machine codes selected from the native instruction set.

Optionally said constraint is selected from the group consisting of a constraint against self-intersection, an angle constraint and a pose prior constraint, Optionally the body model comprises a template, said template including a standard model of a skeleton and skinning, Optionally said template is adjusted as an input to the body model; and wherein said probabilistic fitting algorithm comprises a GMM (Gaussian mixture model) for mapping the data points to the body model.

Optionally said object attached to the body comprises one or more of active markers that provide a detectable signal, or a passive object that is so attached, including without limitation headgear (for example for VR (virtual reality)) or a smart watch.

Optionally said data points identified with joints of the body are identified according to a previously determined position as an estimate.

Optionally said template including a standard model of a skeleton according to a hierarchy of joints as vertices and skinning, and a first determination of a position of said joints of the body are determined according to said template.

Optionally for a given joint, the angle constraints are determined according to a rotational model, for determining 1, 2 or 3 degrees of freedom, and for each degree of freedom, a minimum and maximum angle is determined.

Optionally the system further comprises a camera, and one or more processors having computer instructions operating thereon configured to cause the processor to fit data points from at least one of the camera and the depth sensor relative to a user.

Optionally the camera is configured to collect video data of one or more movements of the user in an environment via optionally a plurality of markers affixed to points on the user's body, the depth sensor is configured to provide at least one of: data to determine the three-dimensional location or position of a user, or a combination thereof, in the environment according to a distance(s) of one or more of the markers from depth sensor in the volume; and TOF (time of flight) data; and the instructions are additionally configured to cause the processor to combine the data from the depth sensor with the video data from the camera to produce a three-dimensional map of the user in an environment of the user.

Optionally each marker comprises either an active or passive sensor.

Optionally each marker comprises an active optical marker for emitting light.

Optionally computer instructions include instructions configured to cause the processor to perform as a calibration module configured to calibrate the system according to tracking one or more active markers.

Optionally at least one of the markers includes an inertial sensor.

Optionally the system further comprises an orientation sensor for determining an orientation of the camera, the instructions are additionally configured to cause the processor to combine the data from the depth sensor with the video data from the camera according to the orientation of the camera.

Optionally the system further comprises one or more additional sensors, wherein at least one of the one or more additional sensors are configured to collect biological signals of the user.

Optionally at least one of the one or more sensors comprise an inertial sensor.

Optionally the instructions are additionally configured to cause the processor to convert sensor signals to sensor data which is sensor-agnostic.

Optionally the computer instructions are additionally configured to cause the processor to clean signals by either removing or at least reducing noise, and or normalizing the signals.

Optionally the computer instructions are additionally configured to cause the processor to perform data analysis on the sensor data.

Optionally computer instructions include instructions which cause the processor to perform as a tracking engine.

Optionally the tracking engine is configured to either track the position of the user's body, track the position of one or more body parts of the user, including but not limited, to one or more of arms, legs, hands, feet, and head, or both.

Optionally the tracking engine is configured to decompose signals representing physical actions made by the user into data representing a series of gestures.

Optionally the tracking engine is configured to decompose signals representing physical actions made by the user into data representing a series of gestures via classifier functionality.

Optionally computer instructions include instructions which cause the processor to perform as a calibration module configured to calibrate the system with respect to the position of the user.

Optionally the system further comprises a plurality of templates, wherein the computer instructions are further configured to cause the processor to initialize a template of the plurality of templates.

Optionally the template features a model of a human body configured only as a plurality of parameters, only as a plurality of features, or both.

Optionally the plurality of parameters and/or features include a skeleton, and one or more joints.

Optionally instructions are additionally configured to cause the processor to utilize the plurality of parameters and/or features to assist in tracking of the user's movements.

Optionally the instructions are configured to map the sensor data onto a GMM (Gaussian mixture model).

Optionally the body model includes a sparse-skin representation.

Optionally the instructions are additionally configured to cause the processor to suppress corresponding gaussians.

Optionally data is mapped to a GMM.

Optionally the data is mapped by a classifier.

Optionally the tracking engine includes a template engine configured to read a template from a template database, and the instructions are additionally configured to cause the processor to operate as a GMM mapper, and to send the template to the GMM mapper.

Optionally instructions are additionally configured to cause the processor to operate as a point cloud decomposer, and to enable the GMM mapper to receive point cloud information therefrom.

Optionally the instructions are configured to apply Kalman filter to determine a pose of the user.

Optionally the instructions are configured to cause the processor to operate as a calibration module configured to calibrate the system according to a scale of the user.

Optionally instructions are configured to cause the processor to operate as a calibration module configured to calibrate the system according to removal of an inanimate object.

Optionally said inanimate object comprises a table which is segmented out of the tracking of the point cloud.

Optionally the instructions are configured to exclude a plurality of points from tracking analysis.

According to at least some embodiments, there is provided a system for tracking at least a portion of a body, comprising: a depth sensor for providing data to determine the three-dimensional location of the body in space according to the distance from depth sensor; a body model, comprising a skeleton; and a computational device having computer instructions operating thereon configured to fit data points from the depth sensor to a body model according to a probabilistic fitting algorithm, wherein said probabilistic fitting algorithm is constrained according to at least one constraint defined by the human body, said constraint being selected from the group consisting of a constraint against self-intersection, an angle constraint and a pose prior constraint, the body model comprises a template, said template including a standard model of a skeleton and skinning, said template is adjusted as an input to the body model; and wherein said probabilistic fitting algorithm comprises a GMM (Gaussian mixture model) for mapping the data points to the body model.

According to at least some embodiments, there is provided a system comprising: a camera; a depth sensor; a body model; one or more additional sensors; and one or more processors having computer instructions operating thereon configured to cause the processor to fit data points from at least one of the camera and the depth sensor relative to a user, to the body model according to a probabilistic fitting algorithm, wherein: the camera is configured to collect video data of one or more movements of the user in an environment via optionally a plurality of markers affixed to points on the user's body, the depth sensor is configured to provide at least one of: data to determine the three-dimensional location or position of a user, or a combination thereof in the environment according to one or more distances of one or more of the markers from depth sensor in the volume; TOF (time of flight) data; the instructions are additionally configured to cause the processor to combine the data from the depth sensor with the video data from the camera to produce a three-dimensional map of the user in the environment.

According to at least some embodiments, there is provided a method for creating and/or using templates for a markerless tracking system comprising: scanning at least a portion of a user's body to form a standard body; modeling the body in 3D; creating a mesh for representing a human body or at least a portion thereof; wherein: vertexes of the mesh are assigned as joints and/or bones, the model is configured to impose a constraint on positions of the vertices, and to reposition skin vertices in terms of joint positions, corresponding the modeled body to one or more template parameters; and exporting the template and/or parameters thereof as a file.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of-methods of at least some embodiments of the disclosure can be described as being performed by a processor, such as a computing platform for executing a plurality of instructions.

Software (e.g., an application, computer instructions) which is configured to perform (or cause to be performed) certain functionality may also be referred to as a "module" for performing that functionality, and also may be referred to a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions—which can be a set of instructions, an application, software—which are operable on a computational device (e.g., a processor) to cause the computational device to conduct and/or achieve one or more specific functionality. Furthermore, the phrase "abstraction layer" or "abstraction interface," as used with some embodiments, can refer to computer instructions (which can be a set of instructions, an application, software) which are operable on a computational device (as noted, e.g., a processor) to cause the computational device to conduct and/or achieve one or more specific functionality. The abstraction layer may also be a circuit (e.g., an ASIC) to conduct and/or achieve one or more specific functionality. Thus, for some embodiments, and claims which correspond to such embodiments, the noted feature/functionality can be described/claimed in a number of ways (e.g., abstraction layer, computational device, processor, module, software, application, computer instructions, and the like).

Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

Embodiments of the present disclosure herein described are by way of example only, with reference to the accompanying drawings. With specific reference now to the drawings in detail, it is stressed that the particulars shown are by way of example and for purposes of illustrative discussion of some embodiments of the present invention only, and are presented in order to provide what is believed to be the most useful and readily understood description of the principles and conceptual aspects of some of the embodiments. In this regard, no attempt is made to show details of some embodiments in more detail than is necessary for a fundamental understanding thereof.

DESCRIPTION OF AT LEAST SOME EMBODIMENTS

Figure 1A:
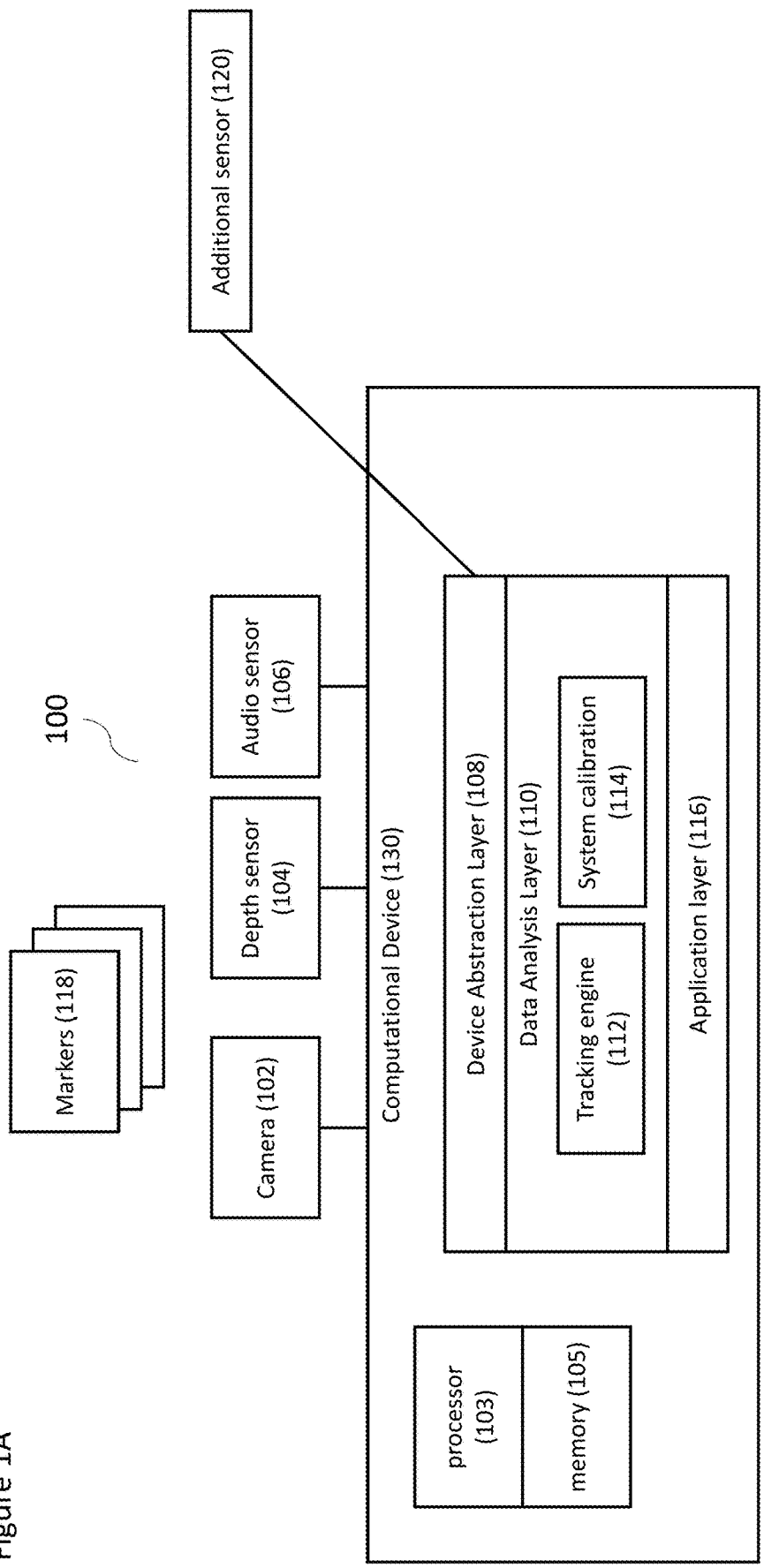
FIGS. 1A and 1B show a non-limiting example of systems according to at least some embodiments of the present disclosure.
Figure 1B:
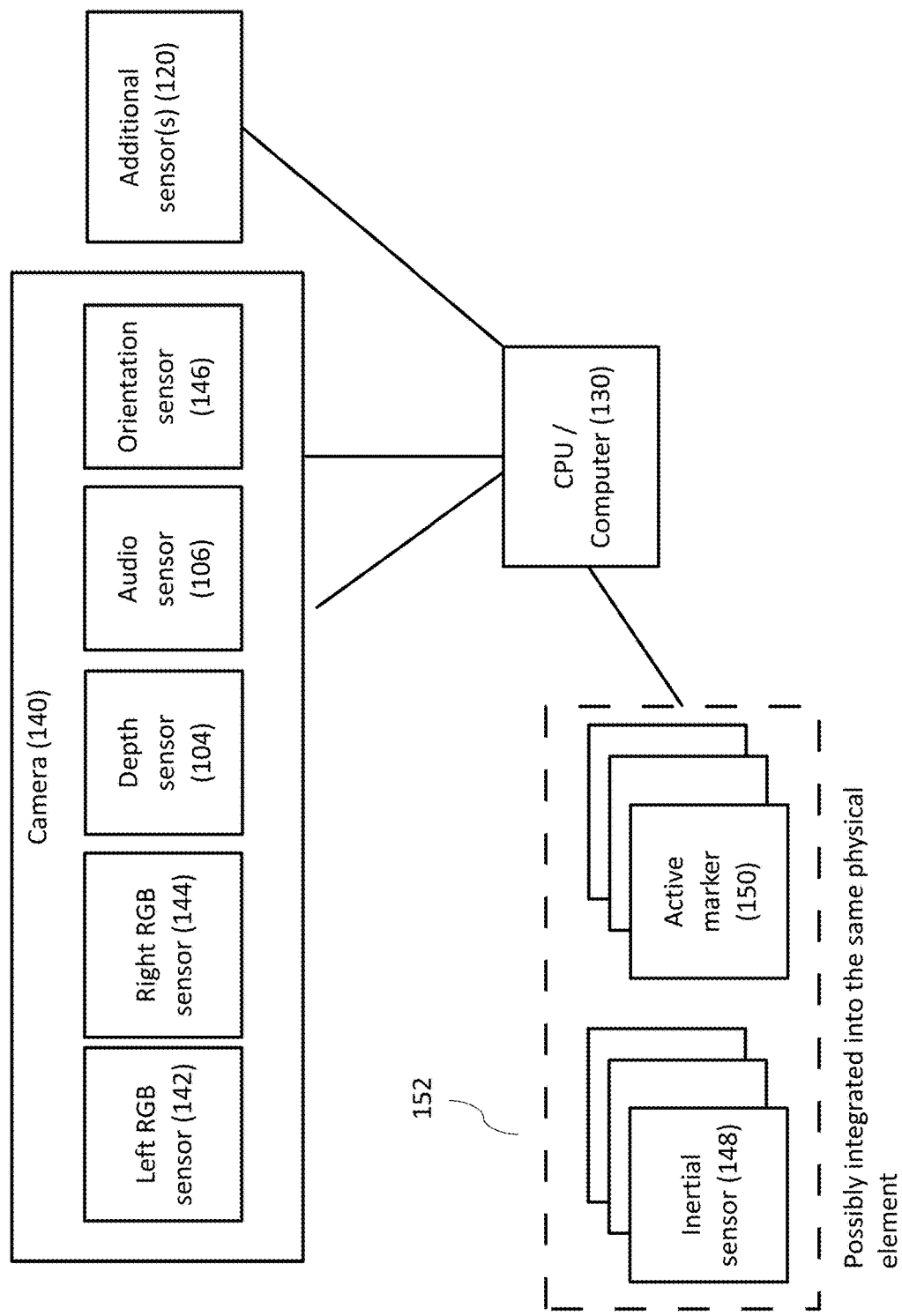

FIG. 1A shows a non-limiting example of a system according to at least some embodiments of the present disclosure. As shown, a system 100 features a camera 102, a depth sensor 104 and optionally an audio sensor 106. Optionally an additional sensor 120 is also included. Optionally camera 102 and depth sensor 104 are combined in a single product (e.g., Kinect® product of Microsoft®, and/or as described in U.S. Pat. No. 8,379,101). FIG. 1B shows an exemplary implementation for camera 102 and depth sensor 104. Optionally, camera 102 and depth sensor 104 can be implemented with the LYRA camera of Mindmaze SA. The integrated product (i.e., camera 102 and depth sensor 104) enables, according to some embodiments, the orientation of camera 102 to be determined with respect to a canonical reference frame. Optionally, three or all four sensors (e.g., a plurality of sensors) are combined in a single product.

The sensor data, in some embodiments, relates to physical actions of a user (not shown), which are accessible to the sensors. For example, camera 102 can collect video data of one or more movements of the user, while depth sensor 104 may provide data to determine the three-dimensional location of the user in space according to the distance of the user from depth sensor 104 (or more specifically, the plurality of distances that represent the three-dimensional volume of the user in space). Depth sensor 104 can provide TOF (time of flight) data regarding the position of the user, which, when combined with video data from camera 102, allows a three-dimensional map of the user in the environment to be determined. As described in greater detail below, such a map enables the physical actions of the user to be accurately determined, for example, with regard to gestures made by the user. Audio sensor 106 preferably collects audio data regarding any sounds made by the user, optionally including, but not limited to, speech. Additional sensor 120 can be a sensor that can collect biological signals about the user and/or may collect additional information to assist the depth sensor 104. Non-limiting examples of biological signals include an EEG sensor, a heartrate sensor, an oxygen saturation sensor, an EKG or EMG sensor, or a combination thereof.

Sensor signals are collected by a device abstraction layer 108, which preferably converts the sensor signals into data which is sensor-agnostic. Device abstraction layer 108 preferably handles the necessary preprocessing such that, if different sensors are substituted, only changes to device abstraction layer 108 would be required; the remainder of system 100 can continue functioning without changes (or, in some embodiments, at least without substantive changes). Device abstraction layer 108 preferably also cleans signals, for example, to remove or at least reduce noise as necessary, and can also be used to normalize the signals. Device abstraction layer 108 may be operated by a computational device (not shown), and any method steps may be performed by a computational device (note—modules and interfaces disclosed herein are assumed to incorporate, or to be operated by, a computational device, even if not shown).

The preprocessed signal data from the sensors can then be passed to a data analysis layer 110, which preferably performs data analysis on the sensor data for consumption by an application layer 116 (according to some embodiments, "application," means any type of interaction with a user). Preferably, such analysis includes tracking analysis, performed by a tracking engine 112, which can track the position of the user's body and also can track the position of one or more body parts of the user, including but not limited, to one or more of arms, legs, hands, feet, head and so forth. Tracking engine 112 can process the preprocessed signal data to decompose physical actions made by the user into a series of gestures. A "gesture" in this case may include an action taken by a plurality of body parts of the user, such as taking a step while swinging an arm, lifting an arm while bending forward, moving both arms, and so forth. Such decomposition and gesture recognition can also be done separately, for example, by a classifier trained on information provided by tracking engine 112 with regard to tracking the various body parts.

It is noted that while the term "classifier" is used throughout, this term is also intended to encompass "regressor". For machine learning, the difference between the two terms is that for classifiers, the output or target variable takes class labels (that is, is categorical). For regressors, the output variable assumes continuous variables (see for example http://scottge.net/2015/06/14/ml101-regression-vs-classification-vs-clustering-problems/).

The tracking of the user's body and/or body parts, optionally decomposed to a series of gestures, can then be provided to application layer 116, which translates the actions of the user into a type of reaction and/or analyzes these actions to determine one or more action parameters. For example, and without limitation, a physical action taken by the user to lift an arm is a gesture which could translate to application layer 116 as lifting a virtual object. Alternatively or additionally, such a physical action could be analyzed by application layer 116 to determine the user's range of motion or ability to perform the action.

To assist in the tracking process, optionally, one or more markers 118 can be placed on the body of the user. Markers 118 optionally feature a characteristic that can be detected by one or more of the sensors, such as by camera 102, depth sensor 104, audio sensor 106 or additional sensor 120. Markers 118 can be detectable by camera 102, for example, as optical markers. While such optical markers may be passive or active, preferably, markers 118 are active optical markers, for example featuring any type of light emitting marker, such as an LED light for example. More preferably, each of markers 118, or alternatively each pair of markers 118, can comprise an LED light of a specific color which is then placed on a specific location of the body of the user. The different colors of the LED lights, placed at a specific location, convey a significant amount of information to the system through camera 102; as described in greater detail below, such information can be used to make the tracking process efficient and accurate. Additionally, or alternatively, one or more inertial sensors can be added to the hands of the user as a type of marker 118, which can be enabled as Bluetooth or other wireless communication, such that the information would be sent to device abstraction layer 108. The inertial sensors can also be integrated with an optical component in at least markers 118 related to the hands, or even for more such markers 118. The information can then optionally be integrated to the tracking process, for example, to provide an estimate of orientation and location for a particular body part, for example as a prior restraint.

Data analysis layer 110, in some embodiments, includes a system calibration module 114. As described in greater detail below, system calibration module 114 is configured to calibrate the system with respect to the position of the user, in order for the system to track the user effectively. System calibration module 114 can perform calibration of the sensors with respect to the requirements of the operation of application layer 116 (although, in some embodiments, which can include this embodiment, device abstraction layer 108 is configured to perform sensor specific calibration). Optionally, the sensors may be packaged in a device (e.g., Microsoft® Kinect), which performs its own sensor specific calibration.

Computational device 130 may further comprise a processor 103 and a memory 105. As used herein, a processor such as processor 103 generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory, such as memory 105 in this non-limiting example. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

FIG. 1B shows a non-limiting example of the implementation of the camera and depth sensor, according to at least some embodiments of the present disclosure (components with the same or similar function from earlier figures are labeled with the same component numbers). Here, a camera 140 includes a plurality of different sensors incorporated therein, including, without limitation, a left RGB (red green blue) sensor 142, a right RGB sensor 144, depth sensor 104, audio sensor 106 and an orientation sensor 146. Orientation sensor 146 is configured to provide information on the orientation of the camera.

The markers of FIG. 1A are now shown in more detail, as markers 152. Markers 152 preferably comprise an inertial sensor 148 and an active marker 150. Active marker 150 can comprise any type of marker which issues a detectable signal, including but not limited to an optical signal such as from an LED light as previously described. A plurality of different markers 152 can be provided; active marker 150 can be adjusted for the plurality of markers 152, for example to show LED lights of different colors as previously described.

Figure 2:
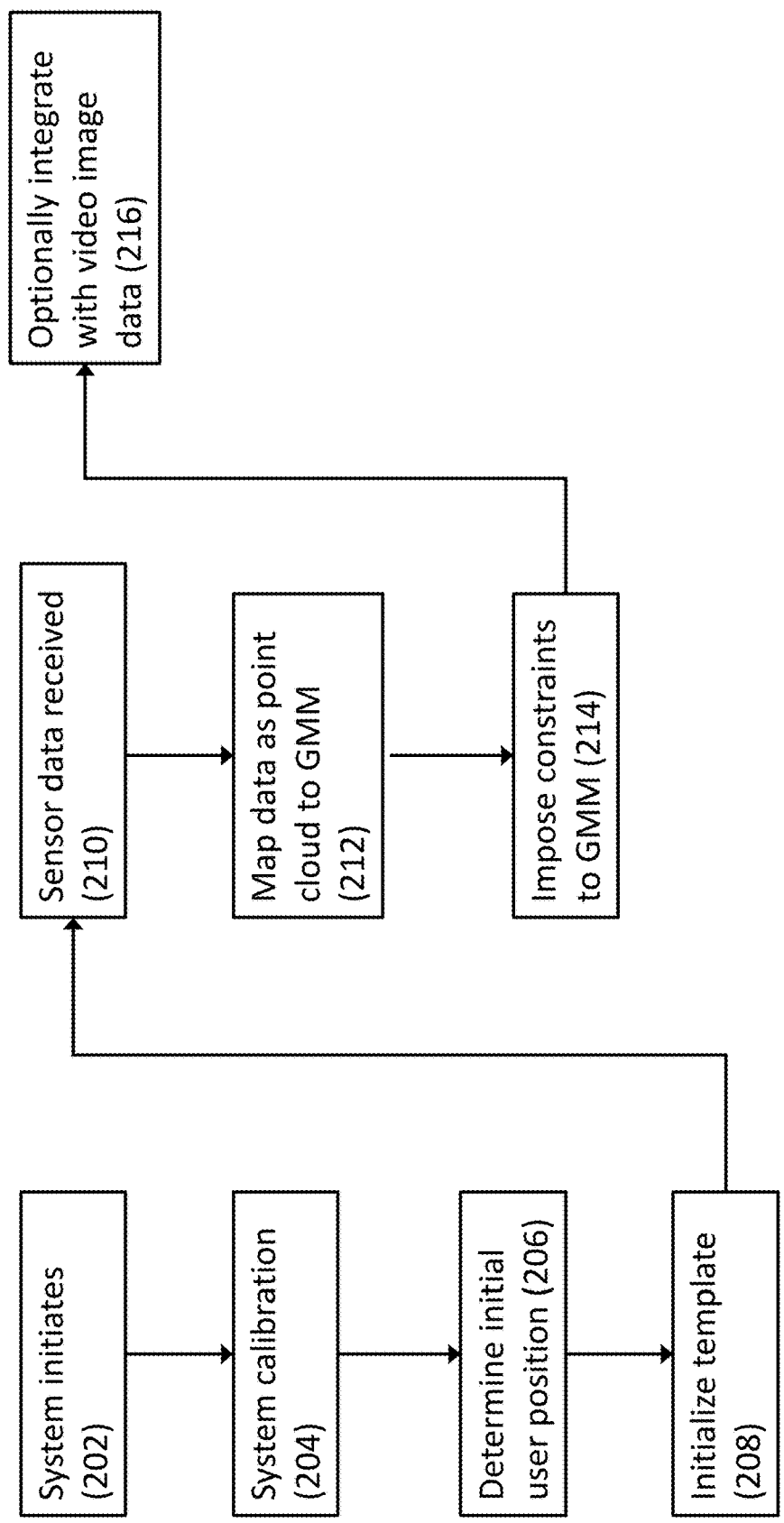
FIG. 2 shows a non-limiting example of a method for tracking the user, optionally performed with the system of FIG. 1, according to at least some embodiments of the present disclosure.

FIG. 2 shows an exemplary, illustrative non-limiting method for tracking the user, optionally performed with the system of FIG. 1, according to at least some embodiments of the present disclosure. As shown, at 202, the system initiates activity, for example, by being powered up (i.e., turned on). The system can be implemented as described in FIG. 1 but may also optionally be implemented in other ways. At 204, the system performs system calibration, which can include determining license and/or privacy features. System calibration may also optionally include calibration of one or more functions of a sensor, for example, as described in reference to FIG. 1A.

At 206, an initial user position is determined, which (in some embodiments), is the location and orientation of the user relative to the sensors (optionally at least with respect to the camera and depth sensors). For example, the user may be asked to or be placed such that the user is in front of the camera and depth sensors. Optionally, the user may be asked to perform a specific pose, such as the "T" pose for example, in which the user stands straight with arms outstretched, facing the camera. The term "pose" relates to position and orientation of the body of the user.

At 208 the template is initialized. As described in greater detail below, the template features a model of a human body, configured as only a plurality of parameters and features, such as a skeleton, joints and so forth, which are used to assist in tracking of the user's movements. At 210, sensor data is received, such as for example, one or more of depth sensor data and/or camera data. At 212 and 214, the sensor data is analyzed to track the user, for example, with regard to the user's movements. Optionally, the sensor data can be mapped onto a body model, e.g., the body model features an articulated structure of joints and a skin defined by a mesh of vertices that are soft-assigned to the joints of the model with blending weights. In this way, the skin can deform accordingly with the body pose to simulate a realistic human shape.

Optionally, the sensor data is analyzed by mapping onto a GMM (Gaussian mixture model) as described herein. As described in greater detail below, optionally, a classifier can be used. Because the user's pose is not likely to change significantly between frames, optionally, the process at 212, 214, while performed iteratively, can only performed with regard to a limited number of iterations. For example, the present inventors have found that, surprisingly, as few as 3-10 iterations may be used to map the data. If a GMM is used, each vertex of the skin defines an isotropic gaussian, whose mean location in the 3D space is a function of the rotation parameters of the joints to which the vertex is attached (rotating the left wrist won't affect the position of the vertices on the right hand skin).

The body model preferably features a sparse-skin representation. Having a sparse-skin representation is convenient to handle occlusions. Both self-occlusions or occlusions of body parts due to clutter or because the user exits the camera frame. One dynamically enables or disables the gaussians that are considered to be occluded at a given frame, so that those disabled won't influence the optimization.

In a different direction, it is also straightforward to model amputee users by suppressing the corresponding gaussians. This can be done online during a calibration process or having a therapist manually configuring the body model. At 212, if a GMM is used, the sensor data is mapped as a point cloud to the GMM. The GMM and mapping are optionally implemented as described with regard to "Real-time Simultaneous Pose and Shape Estimation for Articulated Objects Using a Single Depth Camera" by Mao Ye and Ruigang Yang, *IEEE Transactions on Pattern Analysis & Machine Intelligence,* 2016, vol. 38, Issue No. 08. In this paper, an energy function is described, which is minimized according to the mapping process.

Optionally, only the depth sensor data is used, but alternatively, both the depth sensor and the camera data are used. For example, the calculations may be performed as follows. Given a set of N points x∈X it is desired to fit a GMM with M components $(v_m)$.

$$p(x_n) = (1-u)\sum_{m=1}^{M} p(v_m)p(x_n | v_m) + u\frac{1}{N} \qquad (1)$$

At 214, one or more constraints are imposed on the GMM as described in greater detail below. For example, optionally the model is constrained so that the body parts of the user are constrained in terms of the possible angles that they may assume. At 216, the mapped data is optionally integrated with video data.

Figure 3:
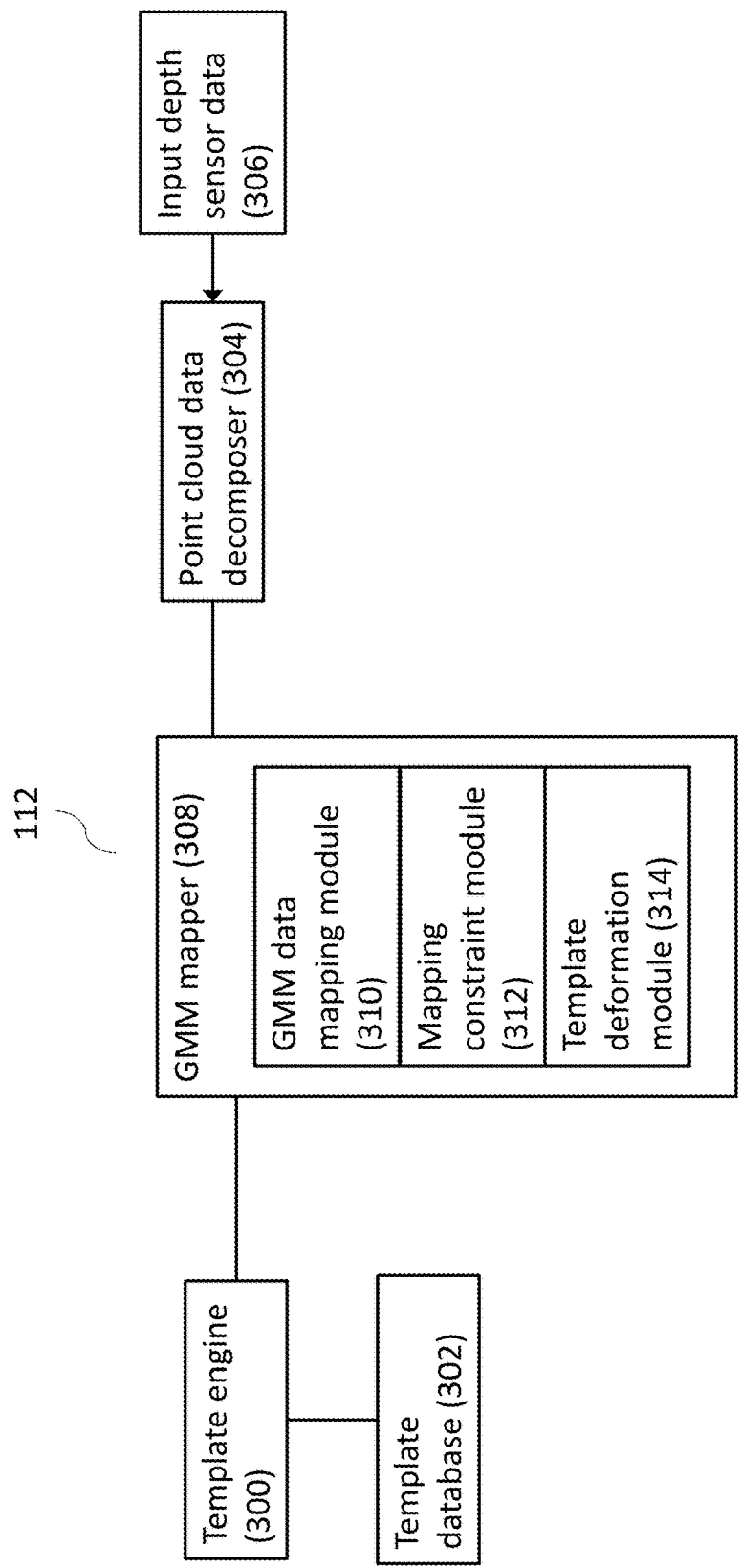
FIG. 3 shows a non-limiting example of a tracking engine, optionally for use with the system of FIG. 1 or the method of FIG. 2, according to at least some embodiments of the present disclosure.

FIG. 3 shows an exemplary, illustrative non-limiting tracking engine, optionally for use with the system of FIG. 1 or the method of FIG. 2, according to at least some embodiments of the present invention. For this embodiment of the tracking engine, the data is assumed to be mapped to a GMM, but as described herein, optionally a classifier is used instead. As shown, the tracking engine features a template engine 300, which reads a template from a template database 302, and then feeds the template to a GMM mapper 308. GMM mapper 308 also receives point cloud information from a point cloud decomposer 304, which receives the depth sensor data as an input in 306. Optionally color camera data could also be provided to point cloud decomposer 304. For example, stereo RGB could be used to assist with the assignment of points to body parts and/or to improve the depth sensor data. Solutions to the problem of configuring depth sensor data to a point cloud is well known in the art and could optionally be performed according to any suitable method. One non-limiting example of a suitable method is provided in "Alignment of Continuous Video onto 3D Point Clouds" by Zhao et al., available at https://pdfs.semanticscholar.org/124c/0ee6a3730a9266dae-59d94a90124760fla5c.pdf.

To increase the speed of processing, the depth sensor data may be configured as follows. To do so a KD-tree of the scene each frame is built, so that when computing correspondences from vertices to cloud one only uses the K nearest neighbors and assume a zero-posterior for the rest. As a consequence, the algorithm runs several orders of magnitude faster. The gating of correspondences allows sparsification of both the distance and the posterior matrix with huge gains on computation speed.

As compared to "Real-time Simultaneous Pose and Shape Estimation for Articulated Objects Using a Single Depth Camera" by Mao Ye and Ruigang Yang, *IEEE Transactions on Pattern Analysis & Machine Intelligence*, 2016, vol. 38, Issue No. 08., which reached real time performance only with a GPU (graphics processing unit), the presently described algorithm, according to some embodiments, can reach real-time performance (100+ fps in a i7 processor) with CPU (central processing unit) only, which is a significant computational advantage.

GMM mapper 308 features a GMM data mapping module 310, a mapping constraint module 312 and a template deformation module 314. GMM data mapping module 310 receives the point cloud data from point cloud decomposer 304 and maps this data onto the GMM, as adjusted by the input template from template engine 300. Next one or more constraints from mapping constraint module 312, for example in regard to the angle range that body parts of the user can assume, are applied to the mapped data on the GMM by mapping constraint module 312. Optionally, such information is augmented by deforming the template according to information from template deformation module 314; alternatively, such deformations are applied on the fly by GMM data mapping module 310 and mapping constraint module 312. In this case, template deformation module 314 is either absent or alternatively may be used to apply one or more heuristics, for example according to pose recovery as described in greater detail below.

Figure 4:
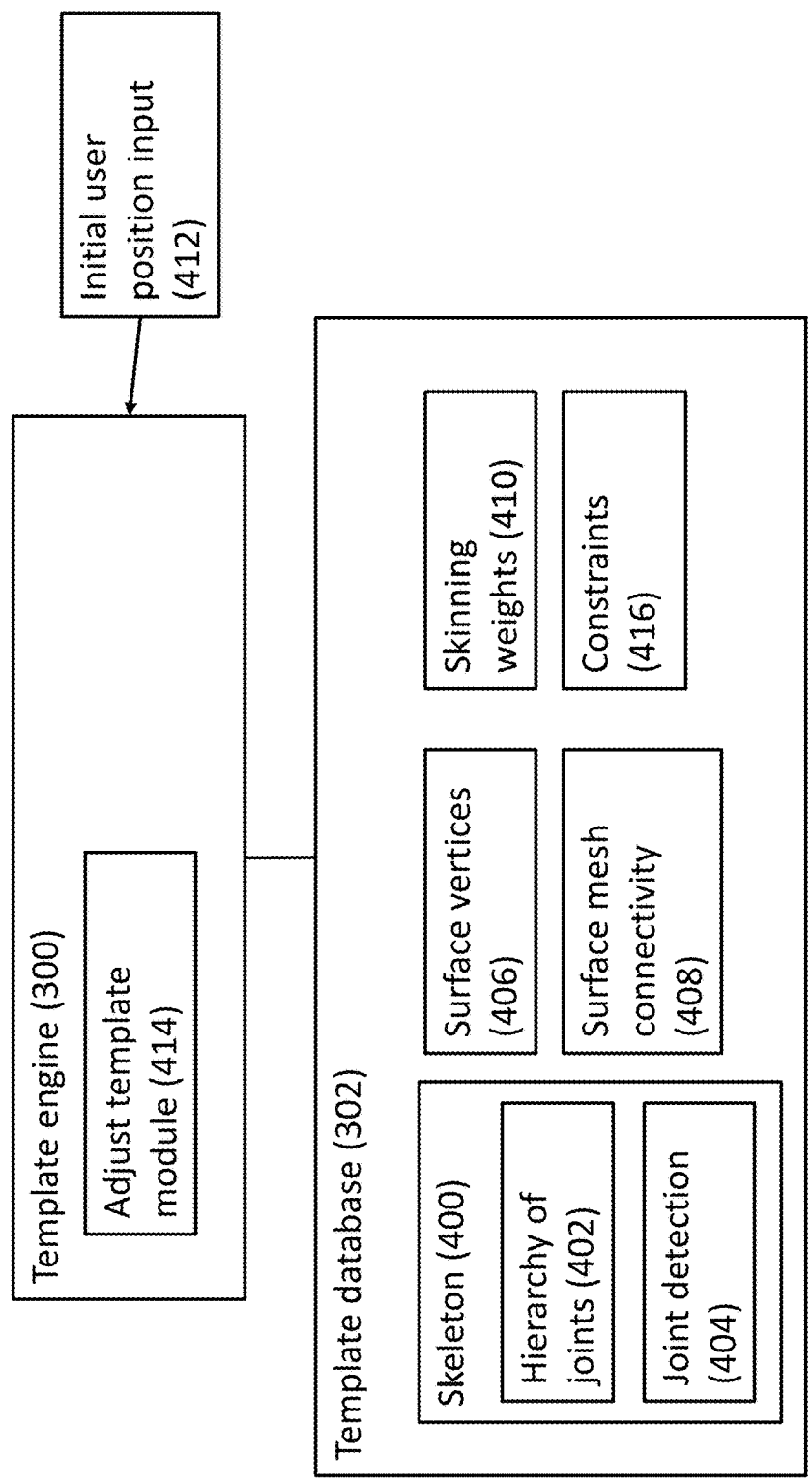
FIG. 4 shows templates and a template engine, according to at least some embodiments of the present disclosure.

FIG. 4 shows templates and the template engine in more detail, according to at least some embodiments of the present disclosure. Template engine 300, according to some embodiments, features an adjust template module 414, which receives information regarding the initial position of the user from an initial user position input 412 and adjusts the template accordingly. For example, if the template is constructed with a standing user, but the user is lying down or sitting, then the template is preferably adjusted according to the actual position of the user. Even if the user's position is the same as that intended by the template, such as standing in a T pose, the template can be adjusted according to the actual user, such as the actual dimensions of the user.

Template database 302 can contain a variety of different types of information in each template. For example, each template preferably includes a skeleton 400, a hierarchy of joints 402 and a joint detection 404. Skeleton 400 defines the virtual skeleton of the user, as determinable from the point cloud data. Each skeleton 400 includes a hierarchy of joints 402, which is (as known) representative of a virtual skeleton with its virtual parts. A hierarchy of joints 402 enables each joint of the user's body to be located and for the location to be determined in context to the location of other joints. Joint detection 404 can relate to information for detecting the joints of the user as specific points, or groups of points, from the point cloud as described in greater detail below.

Each template can also feature surface vertices 406, surface mesh connectivity 408, skinning weights 410 and constraints 416. Surface vertices 406 relate to the vertices on the external body of the user (as opposed to the internal representation of the user's body structure by the virtual skeleton), while surface mesh connectivity 408 defines the external body surface of the user according to a mesh. Skinning weights 410 determine the weights for how the skinning is performed, for example in terms of determining the correct external surface of the user.

Constraints 416 can be used to determine which body positions are not allowed, for example, according to the possible angle ranges of different body part positions. For example, and without limitation, constraints may include one or more of self-intersection, angle, and pose prior. These constraints can be weighted differently. Weighting is preferred, rather than setting the constraints as an absolute bar, as the inventors have determined that surprisingly, the GMM model does not operate efficiently if the search space is too restricted. Therefore, weighting allows the importance of the constraints to be captured without excessively restricting the search space. The constraints can be applied to the previously described energy function.

The self-intersection constraint is optional and may not be applied, as the angle constraints may effectively account for self-intersection according to how they are applied. If applied, the self-intersection constraint may be calculated as follows:

$$(E_{self}) = \frac{1}{|P|} \sum_{(s,t) \in P} \max(0, h_{st}(\Theta^{t-1} + \Delta\Theta)) \qquad (2)$$

$$h_{st}(\theta) = (r_s + r_t)^2 - \|v_r(\theta) - v_t(\theta)\|^2 \qquad (3)$$

$$v_m(\Theta^{t-1} + \Delta\Theta) = v_m + I_m\Delta\xi_g + \sum_{k=1}^{K} \beta_{mk}\hat{\xi}'_k v_m\Delta\theta_k \qquad (4)$$

$$h_{st}(\theta) = (r_s + r_t)^2 - \left\|v_s + \sum_{k=1}^{K} \beta_{sk}\hat{\xi}'_k v_s\Delta\theta_k - v_t - \sum_{k=1}^{K} \beta_{tk}\hat{\xi}'_k v_t\Delta\theta_k\right\|^2 \qquad (5)$$

where $r_s$, $r_t$ represent the radius of the intersecting gaussians. The set P defines the set of pairs of gaussians that should be forbidden to intersect.

In some embodiments, the angle constraints are important for correct operation of the model and are heavily weighted. Constraints are currently applied per angle, but could optionally be applied for all angles jointly. The angle constraints relate to the ranges of angles that various body parts are allowed to achieve.

For a given joint, the angle constraints are preferably determined according to a rotational model, such that for example optionally 1, 2 or 3 degrees of freedom are determined. For example the elbow may be determined to have 1 degree of freedom and the shoulder may be determined to have 3 degrees of freedom. For each degree of freedom, a minimum and maximum angle is determined. As another example of the ranges, the Appendix provides notation in regard to the angles, such that limit_rotation_x relates to the minimum and maximum angle for a first degree of freedom, limit_rotation_y relates to the minimum and maximum angle for a second degree of freedom, and limit_rotation_z relates to the minimum and maximum angle for a third degree of freedom. If the values are set to zero for a limit rotation, then that degree of freedom is not available to the joint and those angles would not change at all. If no specific limit rotations are set, then the joint or bone achieves the rotation of the entire body.

The angle constraints are optionally imposed with a max/mean operator. This operator is non-linear and involves gradient based optimizing. Such angle constraints can be imposed as rotation limits, that are applied using a non-linear term. Non-limiting examples of such terms are described in equations 11, 12 of this paper: "Efficient and Precise Interactive Hand Tracking Through Joint, Continuous Optimization of Pose and Correspondences" by Taylor et al., 2016, available from http://www.samehkhamis.com/taylor-siggraph2016.pdf. One example of a non-limiting method to calculate angle constraints is as follows:

$$E_{limit} = \frac{1}{K}\sum_{i=1}^{K} v(\theta_i^{min}, \theta, \theta_i^{max})^2 \qquad (6)$$

where $v(a, x, b) = \max(0, a-x) + \max(x-b, 0)$. Since it is desired to optimize with respect to $\Delta\theta$, the following equations should be used:

$$E_{limit} = \frac{1}{K}\sum_{i=1}^{K} \max(0, \theta_i^{min} - (\theta_i^{t-1} + \Delta\theta_i)) + \max((\theta_i^{t-1} + \Delta\theta_i) - \theta_i^{max}, 0) \qquad (7)$$

Applying subgradient, and assuming $\Delta\theta$ is very small:

1.

$$\frac{\partial v}{\partial \Delta\theta} = \begin{cases} 0 & \text{if } \theta^{t-1} \geq \theta^{min} \wedge \theta^{t-1} \leq \theta^{max} \\ 2(\theta - \theta^{max}) & \text{if } \theta^{t-1} \geq \theta^{min} \wedge \theta^{t-1} > \theta^{max} \\ -2(\theta_{min} - \theta) & \text{if } \theta^{t-1} < \theta^{min} \wedge \theta^{t-1} \leq \theta^{max} \\ 0 & \text{otherwise} \end{cases} \qquad (8)$$

The pose prior constraints are optionally applied to avoid problems caused by depth sensor noise, like not correctly detecting dark hair or dark clothing. One example of a pose prior constraint is keeping the pelvic bone more or less straight. If the user is sitting at a table or lying down, the lower body can be more or less hidden by the furniture and, as a consequence, the pelvic bone may try to fit outlier points, usually located in the region of the furniture, and the pelvic bone rotates towards the furniture, which is not correct. Another pose prior constraint is to keep the head more or less straight. This is applied to solve noisy rotations of the head that happen if the hair points are not showing due to depth-sensor issues. These pose prior constraints may be applied a priori and/or added to energy function on the fly.

Both pose prior and angle limit constraints, in some embodiments, are implemented with a weighted sum of components in the energy function. The angle limit energy component preferably has a larger weight relative to the pose prior. Data from inertial sensors can also be used for one or more constraints. For example, and without limitation, the orientation of the inertial sensor may be applied as a prior on the orientation of the bones (preferably the hands). Alternatively, the orientation data could be used in the optimization, not as a prior but as an additional specific term.

The inertial data can be introduced as a "super point" as described herein, additionally or alternatively to the above uses. The use as a super point increases the accuracy of the absolute position data, but unless combined with one of the above uses, the orientation data is not retained, which is helpful for determining the position orientation of the hands.

Different templates can be created for different user positions, such as sitting, standing, lying down and so forth. Different templates may also optionally be created according to gender or other demographic information, and/or according to body dimensions (such as for various ranges of height, girth and so forth).

Template engine 300 can be updated as to the above information which would enable a particular template to be selected and/or adjusted, such as demographic information for example. Template engine 300 can then select a particular template from template database 302 according to this information. The adjust template for initial user position module 414 then adjusts the template according to the initial detected user position, which can also relate to initialization of the template for that particular user from the first set of input data.

Figure 5:
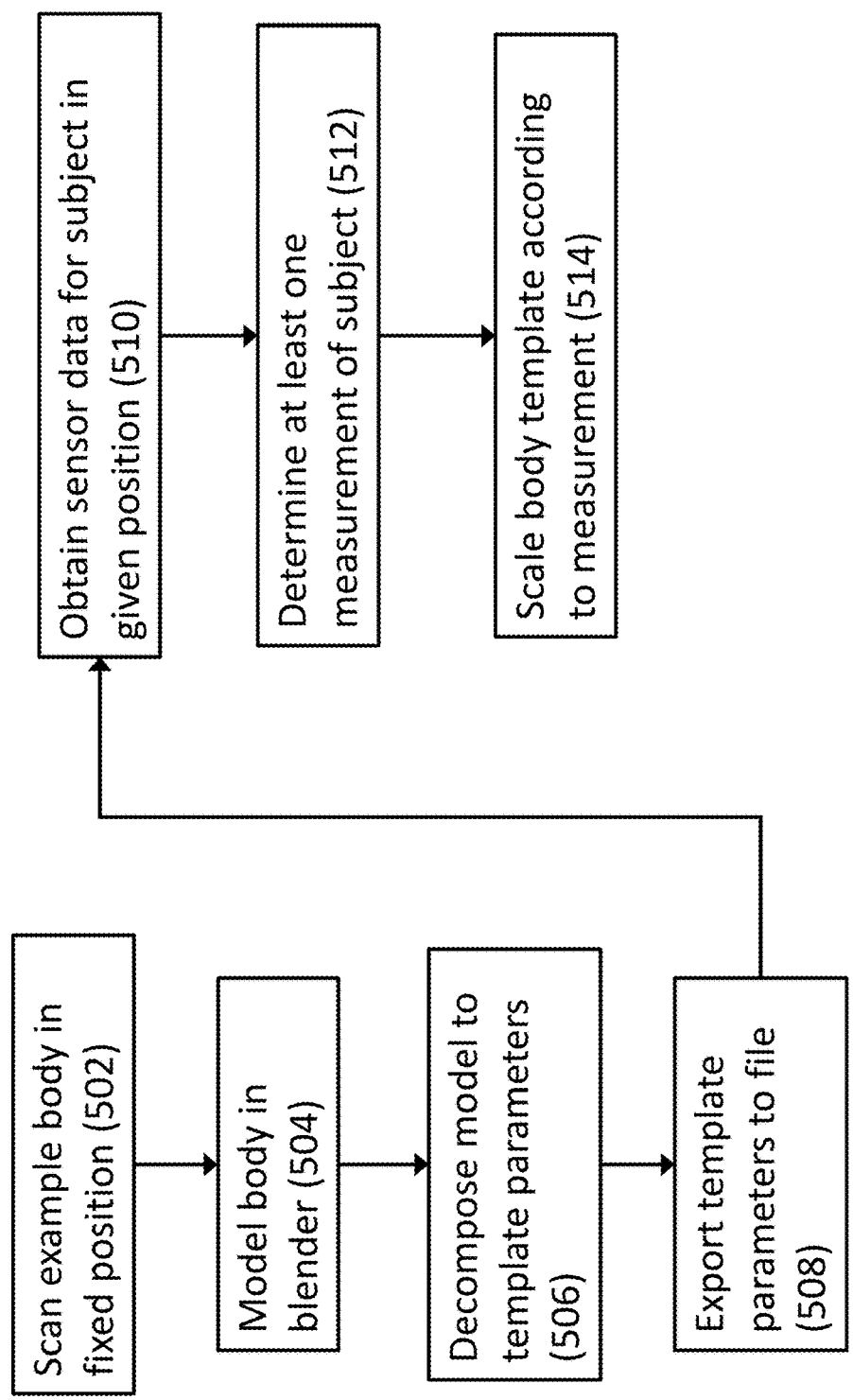
FIG. 5 shows a non-limiting example of a method for creating and using templates, according to at least some embodiments of the present disclosure.

FIG. 5 shows a non-limiting example of a method for creating and using templates, according to at least some embodiments of the present disclosure. As shown, an example user's entire body (or optionally a portion thereof) is scanned in a fixed position at 502, to form a standard body. At 504, the body of the user is modeled in 3D modeling software, for example, according to the Blender software (created by the Blender Foundation) as a non-limiting example. A mesh is created which represents the human body. Each vertex of the mesh, which is each vertex of the skin, is incorporated. Certain vertices can be assigned as "joints" and/or "bones." For example, the vertices of the left forearm would be associated with the left elbow, so that when the left elbow rotates, the vertices of the left forearm also rotate. The model, according to some embodiments, imposes a type of constraint on the possible positions of the vertices, as well as repositioning the skin vertices in terms of joint positions. At 506, the modeled body is corresponded to the template parameters, according to the operation of the specific 3D modeling software. The template parameters in terms of what is included (according to some embodiments) are described with regard to FIG. 4.

At 508, the template parameters can be exported to a file, a portion of a non-limiting example of which is given in the Appendix. The example in the Appendix shows a portion of a standard male body in a T pose. The features are generally self-explanatory, but a few examples are described here for completeness. The global scale parameter means that the orientation is set to the global orientation rather than the object's orientation relating to the scale of the body. Next a list of bones is provided, with their respective names, their initial locations (provided as "head" and "tail" parameters). The rotations can be as previously described. Each bone can be a parent to another bone, such that "sacrum" is the parent to bones such as "l. thigh" or left thigh for example. The skinning weights provide the blending weights, or weights to be assigned for skinning; each data point represents a vertex in the model, with the one or more bone(s) that are influencing the vertex plus the weight(s) for that influence.

At 510, sensor data is obtained for the subject in a given position, which is preferably manually communicated to the template engine as described herein. At 512, at least one measurement of the subject is determined as described herein, for example, with regard to bone length. Such information can be determined from the point cloud. Optionally, as described with regard to FIG. 6 below, different types of point cloud data are used. For example, and without limitation, optical markers can provide "super point" data, as their locations are known according to the different colors of the LED lights featured in the markers. Other non-limiting examples of super point data include points associated with a VR headset, a smart-watch or some other appliance.

Such "super point" data may also optionally be performed with joint detection as described in greater detail below, such as for example with regard to FIG. 10, or alternatively as described in "Random Tree Walk toward Instantaneous 3D Human Pose Estimation" by Jung et al., June 2015 CVPR conference (available from https://researchgate.net/publication/275771971_Random_Tree_Walk_toward_Instantaneous_3D_Human_Pose_Estimation) and/or according to the description provided in "Efficient Human Pose Estimation from Single Depth Images" by Shotton et al., 2011 (available from https://people.eecs.berkeley.edu/~rbg/papers/pose-from-depth-pami/pdf).

Alternatively the point cloud data can be used alone or in combination with one or more types of "super point" data. The measurement that is obtained from the subject is used to initialize the tracking calculations, to adjust the template according to the specific parameters of the user.

At 514, the template is scaled or otherwise adjusted according to the specific parameters of the user, for example, and without limitation, according to one or more of user position, demographic data, size data, particular measurements within the body of the user such as bone length, and the like. Preferably, the dimensions of the user are scaled, not the constraint angles. To adjust the template for scaling, preferably the cost function can be adjusted for the parameter space of bone scales, rather than joint constraints.

Figure 6A:
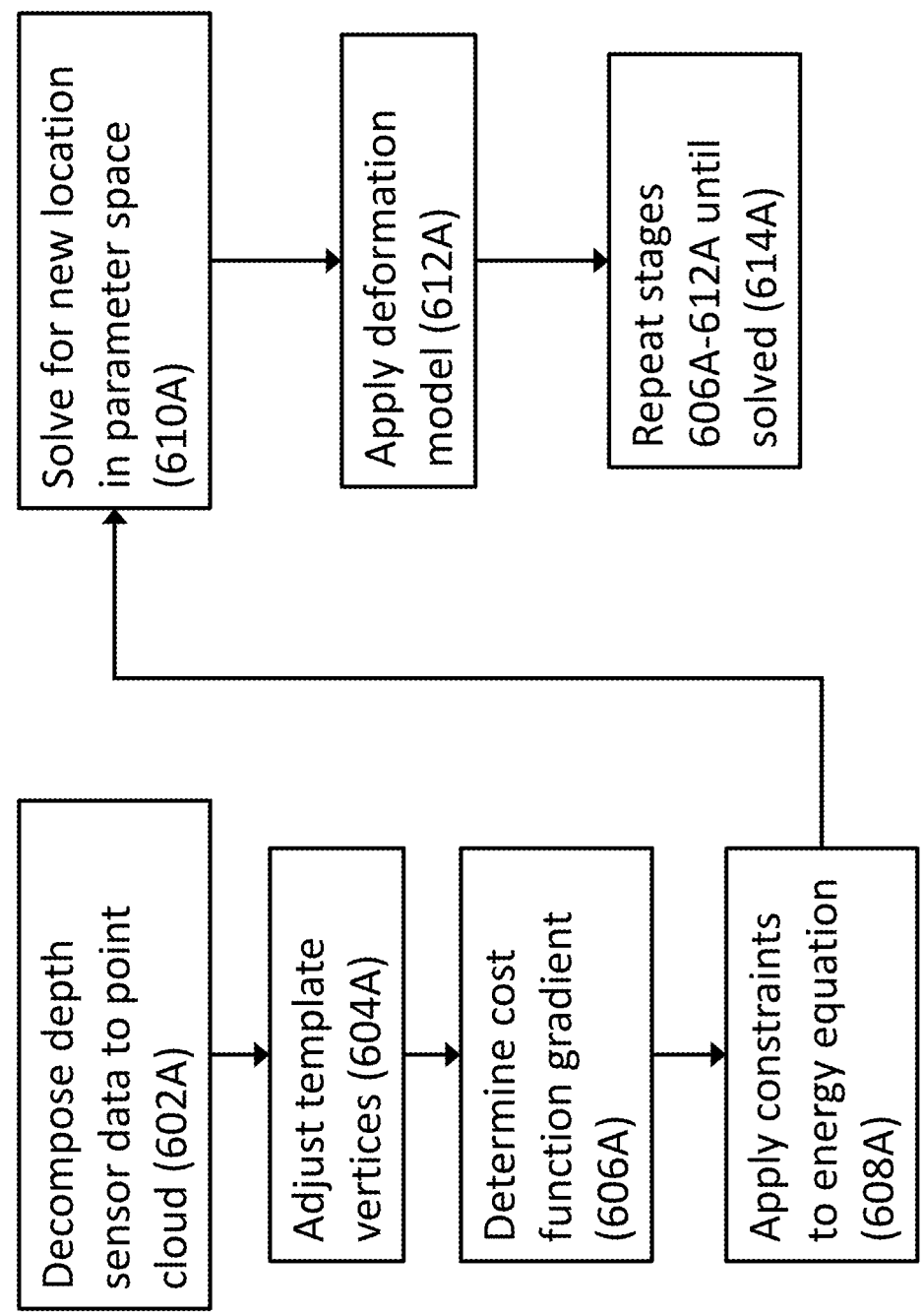
FIGS. 6A to 6E show non-limiting examples of methods for mapping data to track a user, according to at least some embodiments of the present disclosure.

FIGS. 6A to 6E relate to different exemplary, illustrative non-limiting methods for mapping data to track the user, according to at least some embodiments of the present invention. FIG. 6A shows such an exemplary method which uses the point cloud data without weighting any particular points and/or without a priori knowledge regarding these points, to map to a GMM model. At 602A, the sensor data from the depth sensor is decomposed to form point cloud data. At 604A, the template vertices are adjusted, which also includes estimating an initial pose of the user. The adjustment can include adjusting the template according to the user position and scale, and optionally according to other parameters. If the process is being performed on a series of video frames and has already been performed on at least one frame, then optionally such an estimate may take into account a previous pose of the user, as the pose of the user is unlikely to change dramatically between frames. The adjustment of the template vertices preferably also includes the inclusion of the previously described constraints, which can then be applied in later stages to increase the probability of correct minima being obtained.

At 606A, the cost function gradient can be determined. The cost function gradient can be calculated as described with regard to "Real-time Simultaneous Pose and Shape Estimation for Articulated Objects Using a Single Depth Camera" by Mao Ye and Ruigang Yang, *IEEE Transactions on Pattern Analysis & Machine Intelligence,* 2016, vol. 38, Issue No. 08. In this paper, an energy function is described, which is minimized according to the mapping process. The distance is calculated for each point in the point cloud to each vertex for the cost function gradient.

At 608A, one or more constraints can be applied to the energy function, as previously described, although this stage can be performed concurrently at 606A, as part of this stage. At 610A, a new location in the parameter space is solved for with regard to probability density, to determine a most likely location, according to an EM (expectation—maximization) algorithm, which provides an iterative solution. The EM may be applied according to the previously described GMM. At 612A, the deformation model can be applied, for example, as described with regard to FIG. 7, according to the iterative solution from the EM algorithm. At 614A, steps 606A, 608A, 610A and 612A can be repeated until the problem is solved.

Figure 6B:
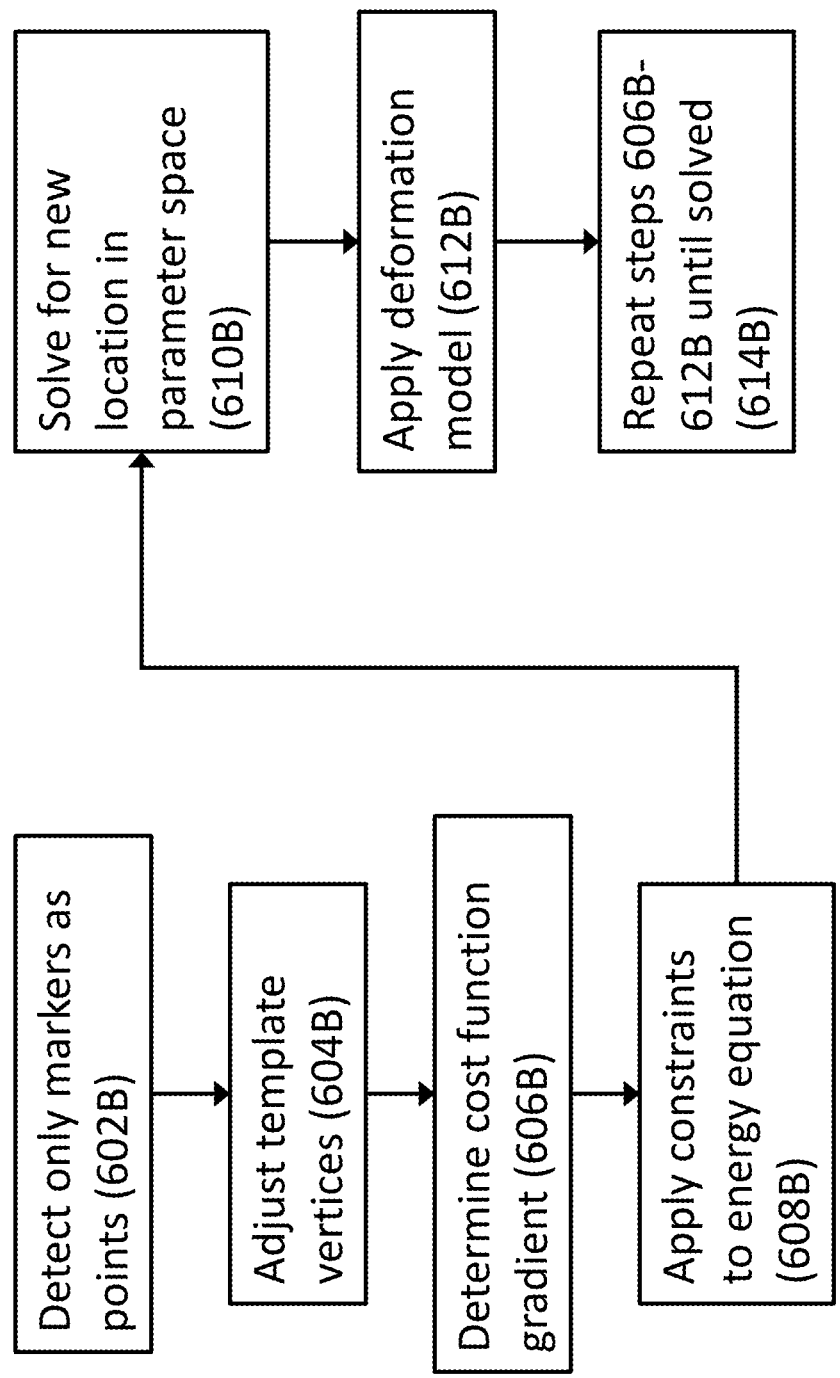

FIG. 6B shows such an exemplary method which uses only optical marker point data, to map to a GMM model. At 602B, only the optical marker data is detected from the point cloud data. The optical marker point data are an example of super points, in that their location on the body can be detected and tracked accurately, because specific colors of LED lights are associated with specific locations. Apart from only using the optical marker point data, the method proceeds as described with regard to FIG. 6A and steps 604B-614B of FIG. 6B correspond to steps 604A-614A of FIG. 6A, except that, optionally, the distance from each point to each vertex does not need to be calculated, which in some embodiments, is due to the possibility to identify each marker with a specific location on the body with a very high degree of likelihood, so that it is known which marker is related to which location on the body.

Figure 6C:
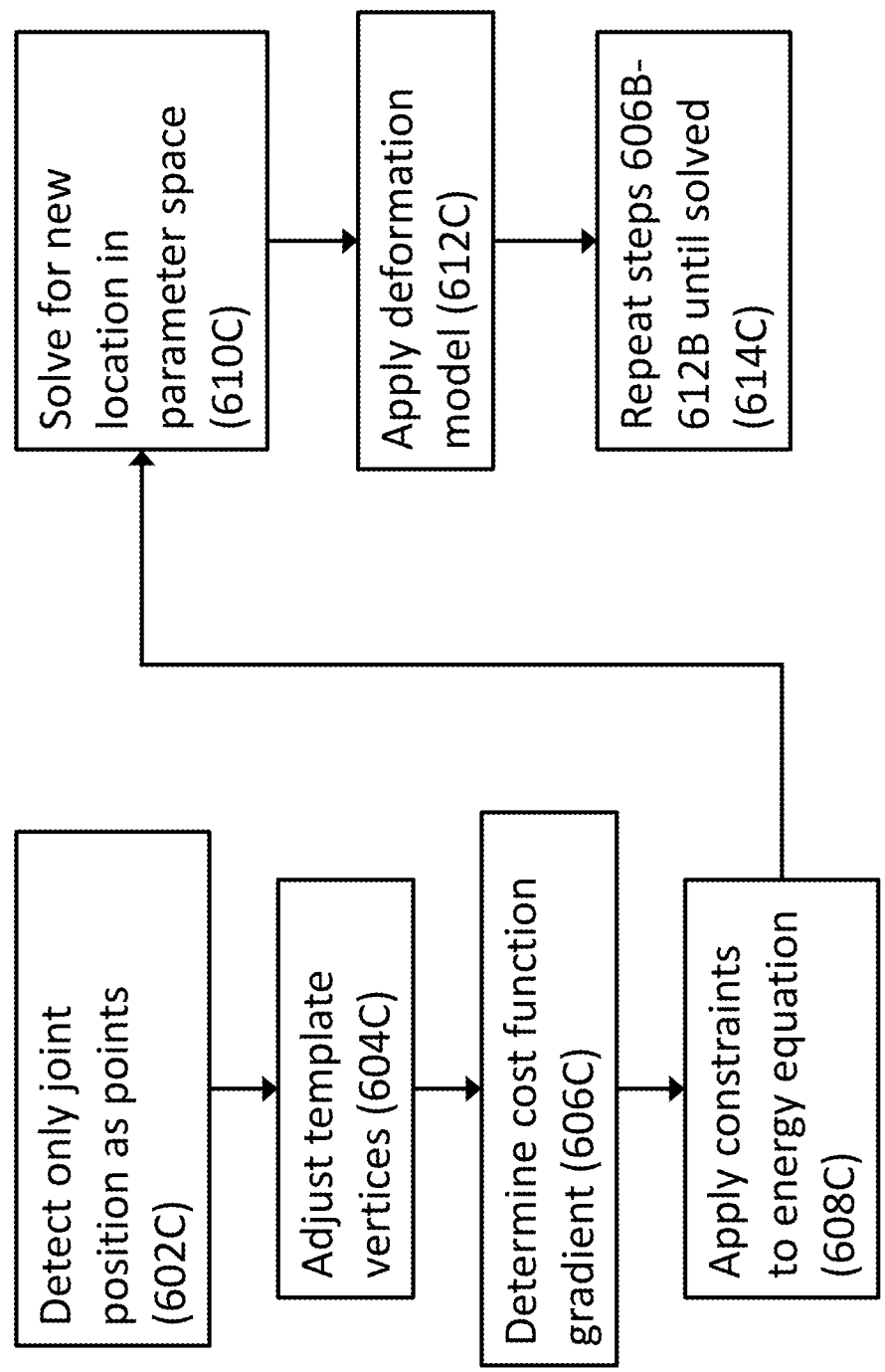

FIG. 6C shows such an exemplary method which uses only joint detection point data, to map to a GMM model. At 602C, only the joint data is detected from the point cloud data. The joint point data are an example of super points, in that their location on the body can be detected and tracked accurately, because of the special joint detection method that can be used as described herein. For example, the joint detection method can be performed according to a classifier as described herein. The joint detection algorithm can permit joints to be detected which can be difficult to label with optical markers (e.g., the jaw or neck). Apart from using only joint detection point data, the method proceeds as described with regard to FIG. 6B and steps 604C-614C of FIG. 6C correspond to steps 604B-614B of FIG. 6B.

Figure 6D:
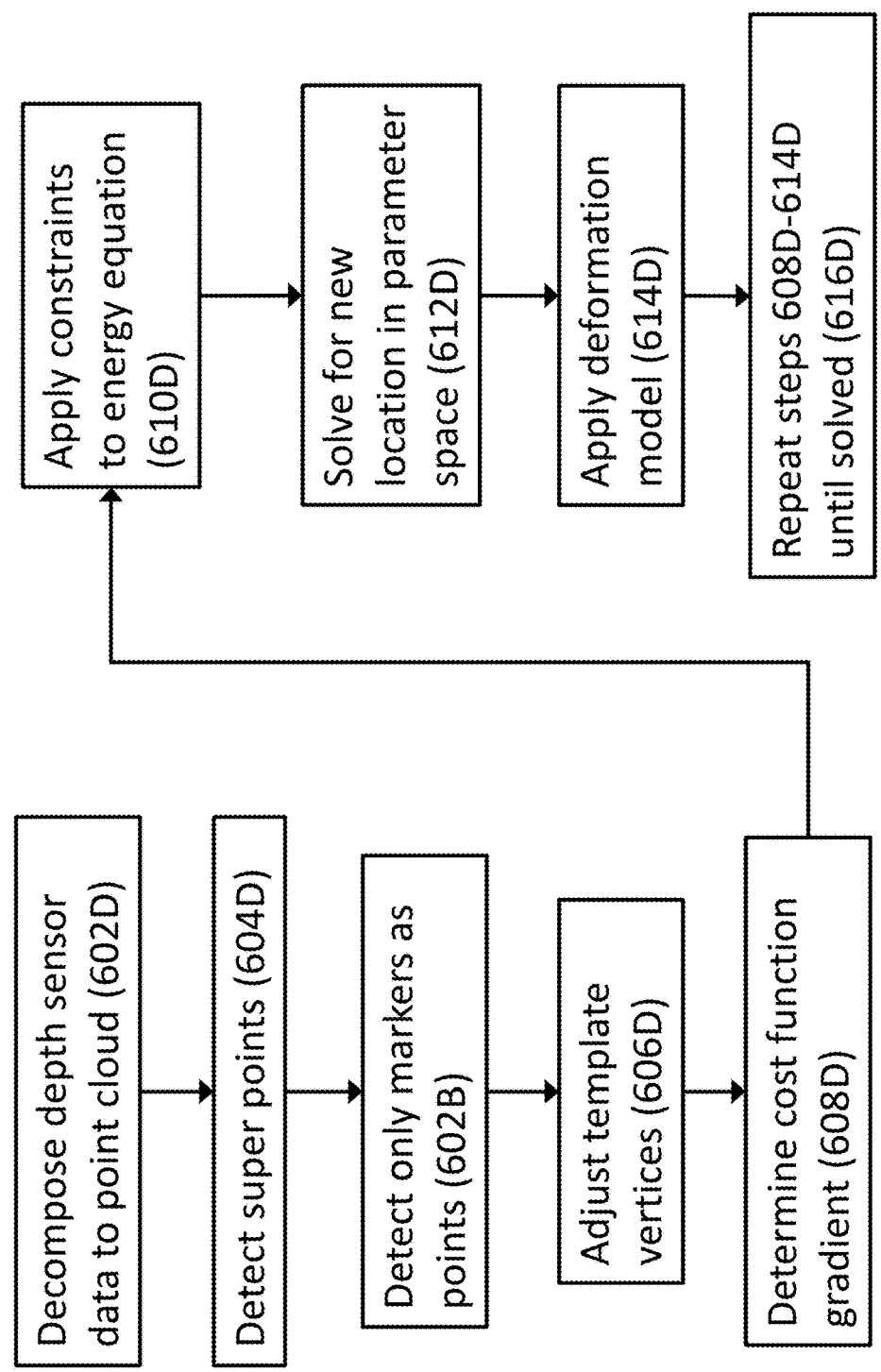

FIG. 6D shows such an exemplary method which uses a combination of super points, with higher weighting, in combination with the remainder of the point cloud data, to map to a GMM model. At 602D, the sensor data is decomposed to a point cloud as described with regard to 602A of FIG. 6A. At 604D, one or more super points are detected and are given higher weighting. The super points may be detected according to the previously described optical markers and/or according to joint detection. The position of the super points may not be reliable but the correspondences to various vertices are known with a high degree of probability, even if the data relating to the position of the super points is noisy. Steps 606D, 608D, 610D, 612D, 614D and 616D can be performed as described with regard to steps 604A, 606A, 608A, 610A, 612A and 614A of FIG. 6A, except that the super points are given a higher weighting for the various calculations performed, over that of regular point cloud data.

Figure 6E:
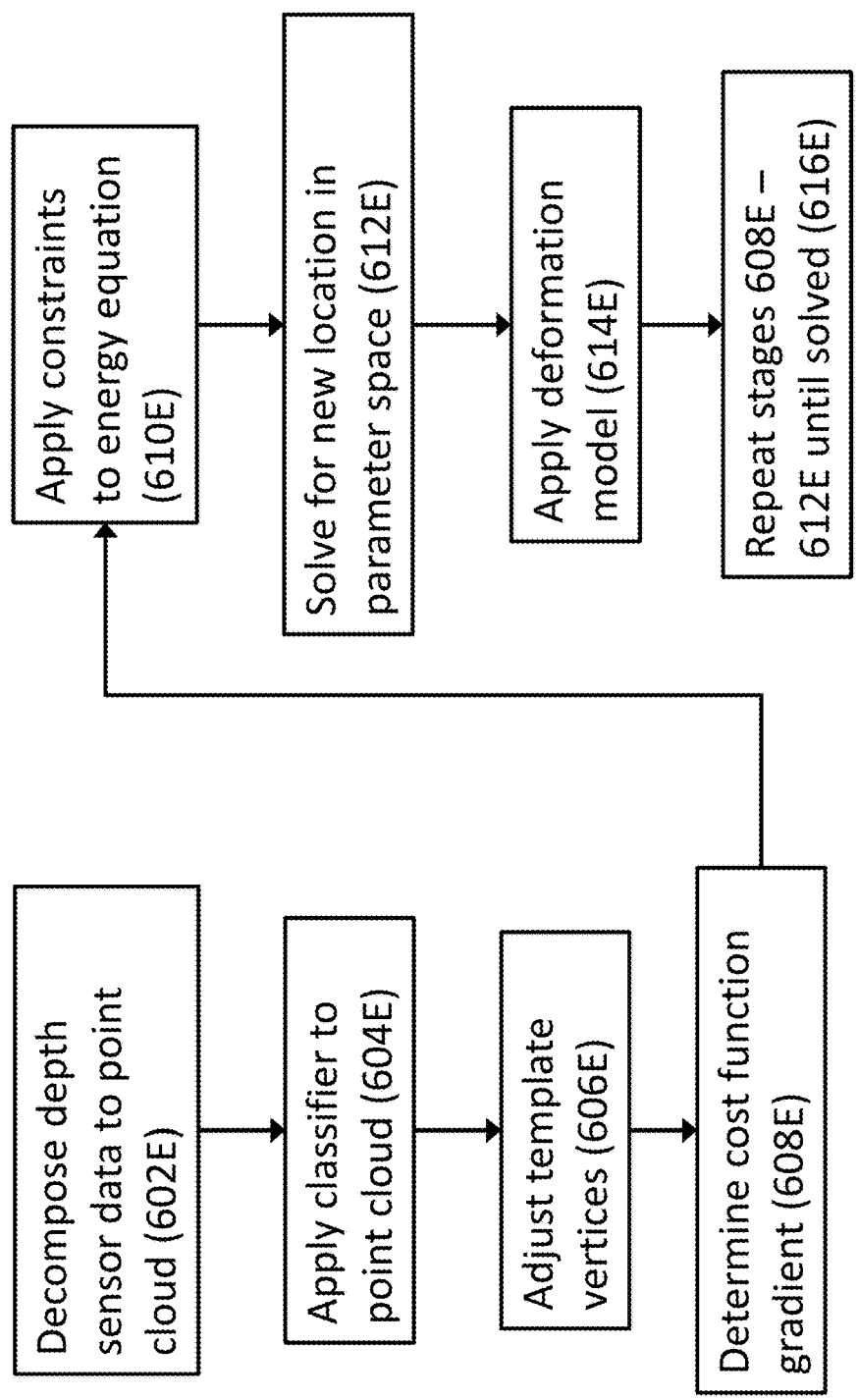

FIG. 6E shows an exemplary method which uses a classifier. At 602E is optionally performed as described with regard to FIG. 6A. At 604E, a trained classifier is applied to the point cloud. The trained classifier preferably features some type of body part classification model, such as described for example in "Efficient Human Pose Estimation from Single Depth Images" by Shotton et al., *IEEE Transactions on Pattern Analysis and Machine Intelligence*, Vol. 35, No. 12, December 2013 (available from https://people.eecs.berkeley.edu/~rbg/papers/pose-from-depth-pami-pdf). The described method operates as follows. Body part classification (BPC) first predicts a body part label at each pixel, and then uses these inferred labels to localize the body joints. The number and location of body parts are selected to provide the most information for determining the joints while at the same time, not overwhelming the trained classifier with data requirements. The trained classifier may be constructed and trained according to any known method, such as for example the random trees method of classification. The location of the joints may then be fed into the previously described generative model of "Real-time Simultaneous Pose and Shape Estimation for Articulated Objects Using a Single Depth Camera" by Mao Ye and Ruigang Yang, *IEEE Transactions on Pattern Analysis & Machine Intelligence*, 2016, vol. 38, Issue No. 08. Such a classification would create a plurality of super points from regular point cloud data, by significantly increasing the probability of a correct assignment to a particular vertex. Therefore, optionally, the remainder of the process would continue only with the super points or alternatively, the super points are implemented with higher weights than other points. The process then continues as for FIG. 6B with the classified points acting as super points, such that steps 606E, 608E, 610E, 612E, 614E and 616E of FIG. 6E correspond to steps 604B-614B of FIG. 6B.

Figure 7:
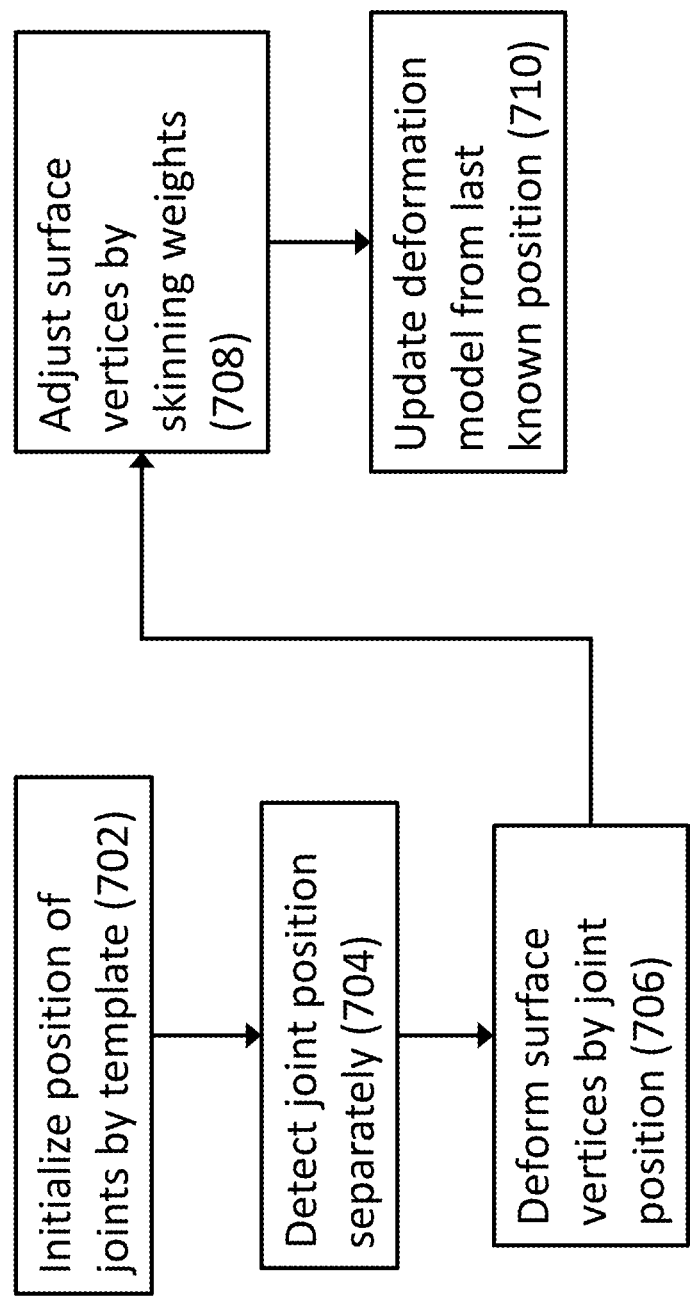
FIG. 7 shows a non-limiting example of a method for applying a deformation model, according to at least some embodiments of the present disclosure.

FIG. 7 shows a non-limiting example of a method for applying the deformation model, according to at least some embodiments of the present disclosure. At 702, the position of the joints is initialized according to the template. At 704, the position of each joint is detected separately. At 706, the surface vertices are deformed according to the joint position. At 708, the surface vertices are adjusted by skinning weights, to smooth the skin over a plurality of bones and joints. The skinning weights are blending weights as previously described, to determine how much each bone or joint determines an input to the skin surface vectors. An exemplary implementation is described in "Real-time Simultaneous Pose and Shape Estimation for Articulated Objects Using a Single Depth Camera" by Mao Ye and Ruigang Yang, *IEEE Transactions on Pattern Analysis & Machine Intelligence*, 2016, vol. 38, Issue No. 08. At step 710, the deformation model is updated from the last known position.

With regard to the modeling of the data as described herein, a specific case relates to modeling of the shoulder joint. Ball-joints are a way of improving the present modeling of 3-DOF (3 degrees of freedom) joints (shoulders) that suffer from several issues due to the representation of rotations. The shoulder joint may be modeled by applying three rotations sequentially, for each DOF. This presents problems mainly related to gimbal lock and that such parameter space is not very well suited for optimization.

An optional implementation uses twists that jointly encode angle, axis, and axis location. It is necessary to decouple the axis location in order to leave the axis vector free, as described for example in Pons-Moll and Rosenhahn, "Ball Joints for Marker-less Human Motion Capture," *IEEE Workshop on Applications of Computer Vision (WACV)*, 2009 (available from https://ps.is.tuebingen.mpg.de/uploads_file/attachment/attachment/140/PonsWACV2010.pdf). One exemplary way to do so is to subtract the axis location from the points rotating with respect to the ball joint and assume in the twist that the axis is in (0, 0, 0).

This adjustment may be applied to any suitable method to model the shoulder joint. For example, it can be used to adjust the deformation model of "Real-time Simultaneous Pose and Shape Estimation for Articulated Objects Using a Single Depth Camera" by Mao Ye and Ruigang Yang, *IEEE Transactions on Pattern Analysis & Machine Intelligence*, 2016, vol. 38, Issue No. 08 as follows. In this paper, the basic deformation model is given by:

$$v_m^{t+1} \approx v_m^t + I_m^t \Delta \xi_g^t + \sum_{k=1}^{K} \beta_{mk} \hat{\xi}_k'^t v_m^t \Delta \theta_k^t \qquad (9)$$

In the above equation, $v_m$ is a vertex of the previously described model $\{\Delta \theta_k^t\}$ relates to the joint angles and $\Delta \xi_g^t$ relates to the global transformation.

To accommodate the improved modeling of the shoulder, the previously described ball-joint information is plugged in and the constraint of ω having unit length is dropped, such that it is possible to represent jointly the rotation axis and the angle as the norm of ω:

$$v_m^{t+1} = v_m^t + I_m^t \Delta \xi_g^t + \sum_{k=1}^{K} \beta_{mk} \hat{\xi}_k'^t v_m^t \Delta \theta_k^t + \sum_{l=1}^{L} (\beta_{ml}(v_m^t - q_l)^\wedge \Delta \omega' + q_l) \qquad (10)$$

It is therefore possible to make a distinction between the indices k which represent degrees of freedom of 1D and 2D joints, and the indices l which represent whole ball-joints. The optimization parameters are transformed from three scalar angles $\Delta \theta$ to a 3-dim vector $\Delta \omega' \theta$ that represents both angle and axis orientation. The vector $q_l$ refers to the location of the axis of joint l. Note that the twist is primed, so to recover the original the coordinate transform needs to be undone:

$$\Delta \omega_l \theta_l = ((T_l)^{-1} \Delta \omega_l' \theta_l)^T T_l \qquad (11)$$

At 710, the deformation model is updated from the last known position, according to the calculations in the previous stages.

Figure 8:
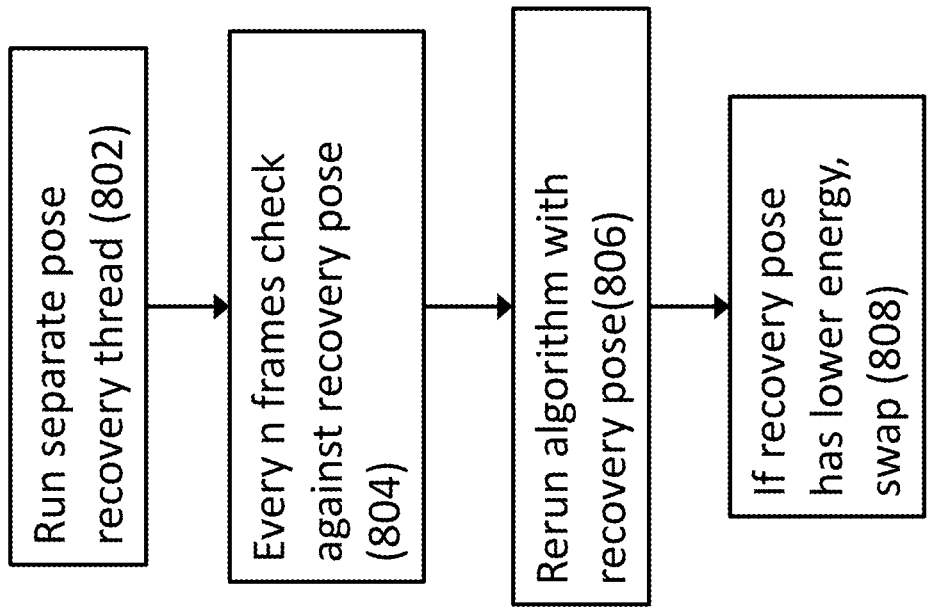
FIG. 8 shows a non-limiting example of a method for pose recovery, according to at least some embodiments of the present disclosure.

FIG. 8 shows a non-limiting example of a method for pose recovery, according to at least some embodiments of the present disclosure. At 802, a separate pose recovery thread is operated, which is separate from the main thread which is tracking the user and performing the above described pose calculations. To avoid overwhelming available computational resources, the pose recovery process is preferably operated intermittently rather than continuously. At 804, for every n frames, the recovery pose is calculated from the point cloud data to determine the energy level of that pose. The number n can be any plurality of frames, such as from 2 to 10 frames, but is preferably from 3 to 5 frames. The initialization is applied with the previous frame's pose as the seed point but rerun to fit the data according to the GMM. The algorithm is then rerun with the recovery pose in stage 3. At 808, the current calculated pose of the user is compared to the recovery pose. If and only if the recovery pose has lower energy in terms of the calculation of the point cloud, then the current calculated pose is replaced with the recovery pose. The recovery pose can be a resting pose of the user, for example.

In accordance with preferred embodiments, bone size can be scaled to address the problem of some bones in the avatar being sized too large or small in relation to other related bones in the displayed model. Bone scaling generally is known in the art and is discussed, for example in Ye et al., "Real-time Simultaneous Pose and Shape Estimation for Articulated Objects Using a Single Depth Camera." Prior art solutions either manually set the data for scaling of limbs and exact locations of the markers or use a dataset of prototypical bodies and use the one that best fits the user, either manually or automatically. Other prior art solutions rely on classifiers, deep learning, or analysis of RGB data. The exemplary method disclosed herein for scaling bones provides better scaling results while requiring less computational power than other solutions. In particular, the bone scaling disclosed herein adapts the model to the user in terms of body scale and marker placement and, importantly, the tracking is robust to variability of these factors, and avoids having to manually set this information by an operator. Additionally, the inventors have observed a decrease in the error.

In accordance with preferred embodiments, a marker offset from a joint (i.e., end of a bond) is calculated as pose is calculated and, as a separate process, bone scaling is determined. That is, the processes are preferably alternated. Preferably, as pose is calculated, bone scaling is held fixed and as bone scaling is calculated, pose is held fixed.

Optionally, the solution could use pose or bone scaling to get out of local minimum of the other. Markers can be present in both scale and pose, which regularizes the solution and, thus, prevents major problems. That is, markers act as a constraint.

Optionally, anatomical constraints can be used. This solution determines how much to allow a bone to scale if a neighbor bone scales. For example, if a bone scales 1 unit, the neighbor might only scale 0.5 unit. This can be used, for example, if the arm is straight and the elbow may be hard to locate. Preferred embodiments consider the effect of amputation. Furthermore, preferred embodiments provide symmetry. That is, if the left arm grows, the right arm grows by a similar scale. The solution also adjusts for a child, and other body types (at least 2-3 body types). Optionally, the solution calibrates for body type such that where multiple body types are tried, the one preferably with the minimum energy is kept. Preferred embodiments can account for body types based on different criteria including the age of person and whether the person is an amputee.

Preferably, the scale of the skinned model should match the real scale and proportions of the user in order to facilitate the pose estimation and reach a low energy solution during optimization. Automatic bone scaling generally is disclosed in the prior art, for example, in "Real-time Simultaneous Pose and Shape Estimation for Articulated Objects Using a Single Depth Camera" by Mao Ye and Ruigang Yang, *IEEE Transactions on Pattern Analysis & Machine Intelligence*, 2016, vol. 38, Issue No. 08. Ye and other prior art solutions suffer from accuracy problems however. The inventors have discovered that specially weighting points, applying a novel approach to optimizing offsets, and re-parameterizing the problem in terms of bone scales instead of orientations as discussed below improves on the accuracy of Ye and the prior art.

Preferred embodiments use an energy function similar to the energy function disclosed in Ye to match the model skin to the point cloud and to minimize the objective:

$$Q(S) = \sum_{m,n} \frac{p_{nm}}{2\sigma^2} f_{m,n}(S) + \frac{\hat{p}}{2\sigma^2} \sum_{\hat{m},\hat{n}} f_{\hat{m},\hat{n}}(S) \quad (12)$$

-continued $$f_{m,n}(S) = \sum_{k=1}^{K} \rho_{mk} s_k d_k - x_n \quad (13)$$

where $\rho_{mk} = \rho_{mk} - \alpha_{mk}(1-\gamma_{mk})$

The first and second term in Eq. 12 refer to the mapping of points (n) to mesh vertices (m) and marker detections ($\hat{n}$) to mesh marker sites ($\hat{m}$) respectively. In the first term, the weighting factor $p_{nm}$ is optimized during tracking, while for the marker objective function it is fixed as a constant parameter $\hat{p}$ for all marker-site correspondences. We could as well set-up different weights for the different marker-sites correspondences so that we could induce for instance more attraction wrists-markers and less in shoulders-markers if it would fit our use-case.

Figure 9:
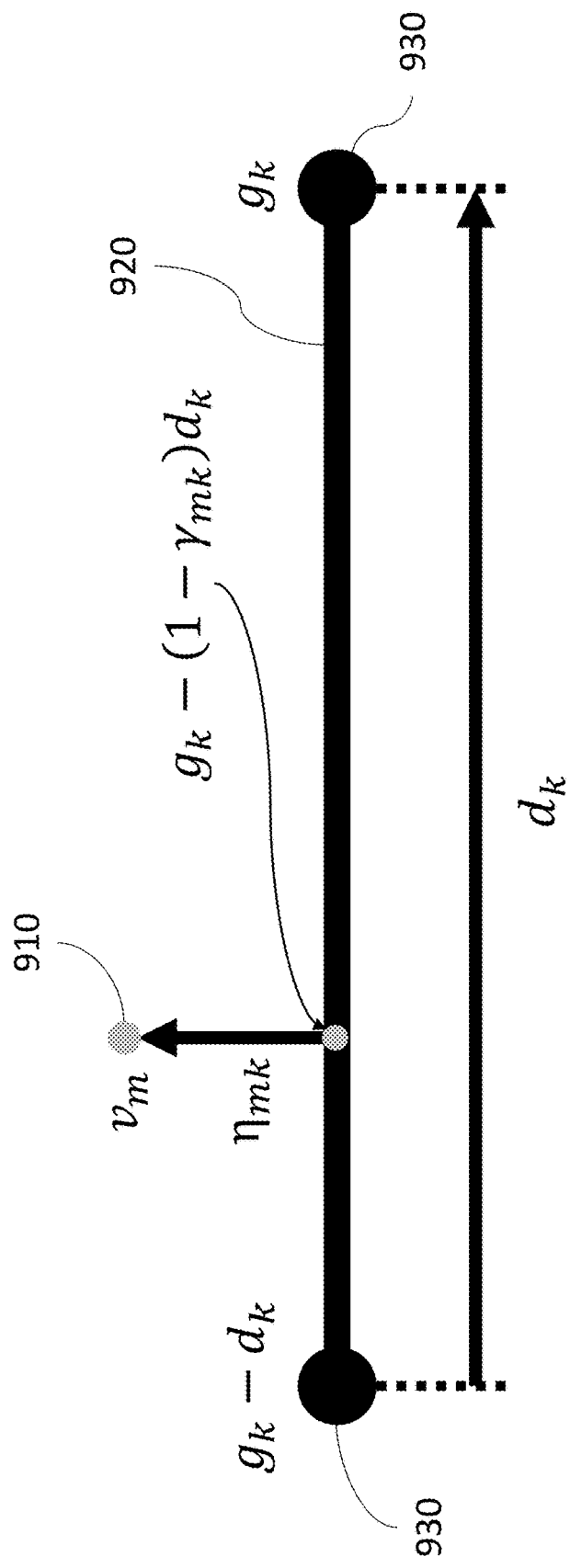
FIG. 9 shows a prior art diagram of bone parameters.

Referring now to FIG. 9, a diagram of bone coordinates taken from Ye is shown for illustrative purposes. The point 910 represents a vertex of the skin. The segment 920 represents a bone of the skeleton and the two circles 930 represent the head and tail joints of the bone. The parameter optimized are the bone scales $s_k$ for each bone k. The vector $\eta_m$ denotes the vector between the bone k and the vertex m, perpendicular to the bone. The matrices $\alpha$ and $\beta$ are the same as defined for pose estimation that encode the skin blending weights. The term $g_r$ denotes the position of the root of the body. The coefficient $\gamma_{mk}$ parametrizes the bone coordinates to indicate the projection of the vertex in the bone.

In preferred embodiments, we constrain the scaling optimization with some reasonable priors because of the presence of outliers and noise. The types of priors can include symmetry and connectivity. Preferred system embodiments can constrain symmetric bones to scale similarly, can constrain connected bones to scale together, or both so that the proportions of the body do not alter. In order to impose the symmetry and connectivity constraints, preferred embodiments apply the following set of constrains to the cost function:

$$\lambda_s \omega_{i,j} s_i = \lambda_s \omega_{i,j} s_j \forall (i,j,\omega) \in \mathcal{B} \quad (14)$$

The term $\lambda_s$ weights the importance of the constraint against the rest of the objective. The weights $\omega_{i,j}$ indicates the strength of the specific pair/constraint. For instance, for symmetric pairs (e.g., left forearm, right forearm) preferred embodiments can use $\omega=1$ to encourage the same scale to be applied to both bones. In the case of connected (e.g., left upperarm, left forearm) bones preferred embodiments can use $\omega=0.5$ to indicate that one bone can scale only to half (or twice) the scale of the other. The set $\mathcal{B}$ contains all constraints to apply as triplets $\{bone_i, bone_j, \omega_{i,j}\}$.

Preferred embodiments can use markers to aid the tracking to make the estimation more robust in the case of outliers and avoids the optimizer to get trapped in bad local minima. As a practical matter, marker placement on the body may not be precise (e.g., misplacement by the user or a therapist) and can change during use. Preferred embodiments of the present invention account for this uncertainty by using a different energy that models an offset between the expected location of the marker and the location that we observe during tracking. This offset optimization process could be run continuously alongside the pose estimation, or be executed once during a calibration process and fixed for the rest of the activity.

The vertex-to-point distance component in the original objective has the form:

$$Q(\Theta, \sigma^2) = \frac{1}{2\sigma^2} \sum_{n,m} p_{nm} \|x_n - v_m^\Theta\|^2 \quad (15)$$

while a new term to formulate a marker-detection distance for the offset optimization process in preferred embodiments is introduced per the following:

$$Q(\Theta, O, \sigma^2) = \frac{1}{2\sigma^2} \left( \sum_{n,m} p_{nm} \|x_n - v_m^\Theta\|^2 + \sum_{c \in C} p_c \|x_c - (v_c^\Theta + o_c)\|^2 \right) \quad (16)$$

The set defines all pairs of correspondences between markers in the model and detections of color markers that the marker detection system provides. For instance, an example of the contents of the set C could be {purple detection-left elbow marker, blue detection-right wrist marker, green detection-left shoulder marker, etc.}.

For each of these correspondences c we estimate the offset $o_c$ that accounts for those small misplacements that we mentioned previously. The goal is to avoid the body pose to change drastically due to small shifts of the markers (or disagreements on their predefined locations).

Finally, we can also regularize the norm of those offset vectors to avoid the offsets to account for all the misplacements that happen. As an extreme example the body could stay motionless while the offset vectors account for all the motion of the markers. To do so we simply penalize the sum of the norm of the offset vectors to keep them as small as possible:

$$E = Q(\Theta, O, \sigma^2) + \lambda_o \sum_{c \in C} \|o_c\|^2 \quad (17)$$

The meta-parameter $\lambda_o$ weights the influence of the regularizer against the main objective. Tuning this parameter adjusts to which extent the offsets should account for marker motion.

Figure 10:
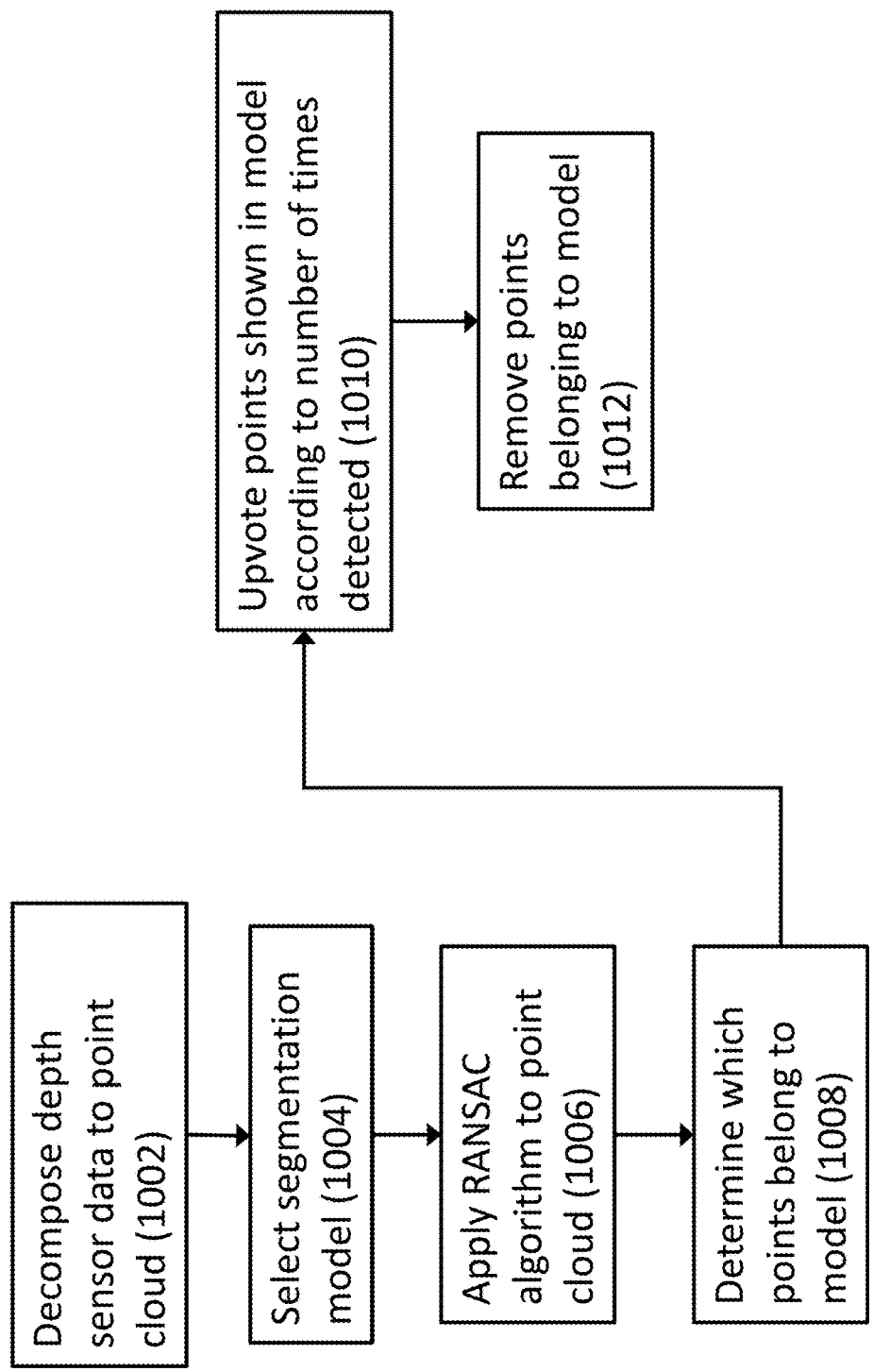
FIG. 10 shows a non-limiting example of a method for segmentation of a background object, according to at least some embodiments of the present disclosure.

FIG. 10 shows a non-limiting example of a method for segmentation of a background object, according to at least some embodiments of the present disclosure. Here, the background object can be an inanimate object (which should not be confused with the user), such as a table, chair, bed or other piece of furniture. At 1002, the point cloud is generated from the sensor data as previously described, followed by 1004, where a segmentation model is selected. For example, the segmentation model can be a simple model, such as a planar model, for certain types of background objects such as a table for example.

At 1006, the RANSAC (random sample consensus) algorithm is applied to the point cloud data according to the selected segmentation model. This algorithm is probabilistic and iterative and is used to detect (and remove) outliers from a point cloud data, in order to fit this data to the segmentation model. A non-limiting example of the application of the RANSAC model to segmentation according to a planar model is described in "RANSAC algorithm and elements of graph theory for automatic plane detection in 3D point clouds", by Martyna Poreba and Francois Goulette, *Symposium de PTFiT* (*Polish Society for Photogrammetry and Remote Sensing*), September 2012, Poland. 24, pp. 301-310, 2012.

At 1008, the group of points that are most likely to belong to the selected segmentation model are located, and optionally, at 1010, if the method described herein has been performed more than once, then points which were previously detected as belonging to the model are up-voted. Because the object being segmented is a background, inanimate object, its position is not likely to change during the tracking process. Therefore, once a point has been determined to belong to the background object, it is likely to continue to be correctly associated with that object. At 1012, points that have been determined to belong to the model are removed, as such points could interfere with the correct tracking of the user.

Figure 11:
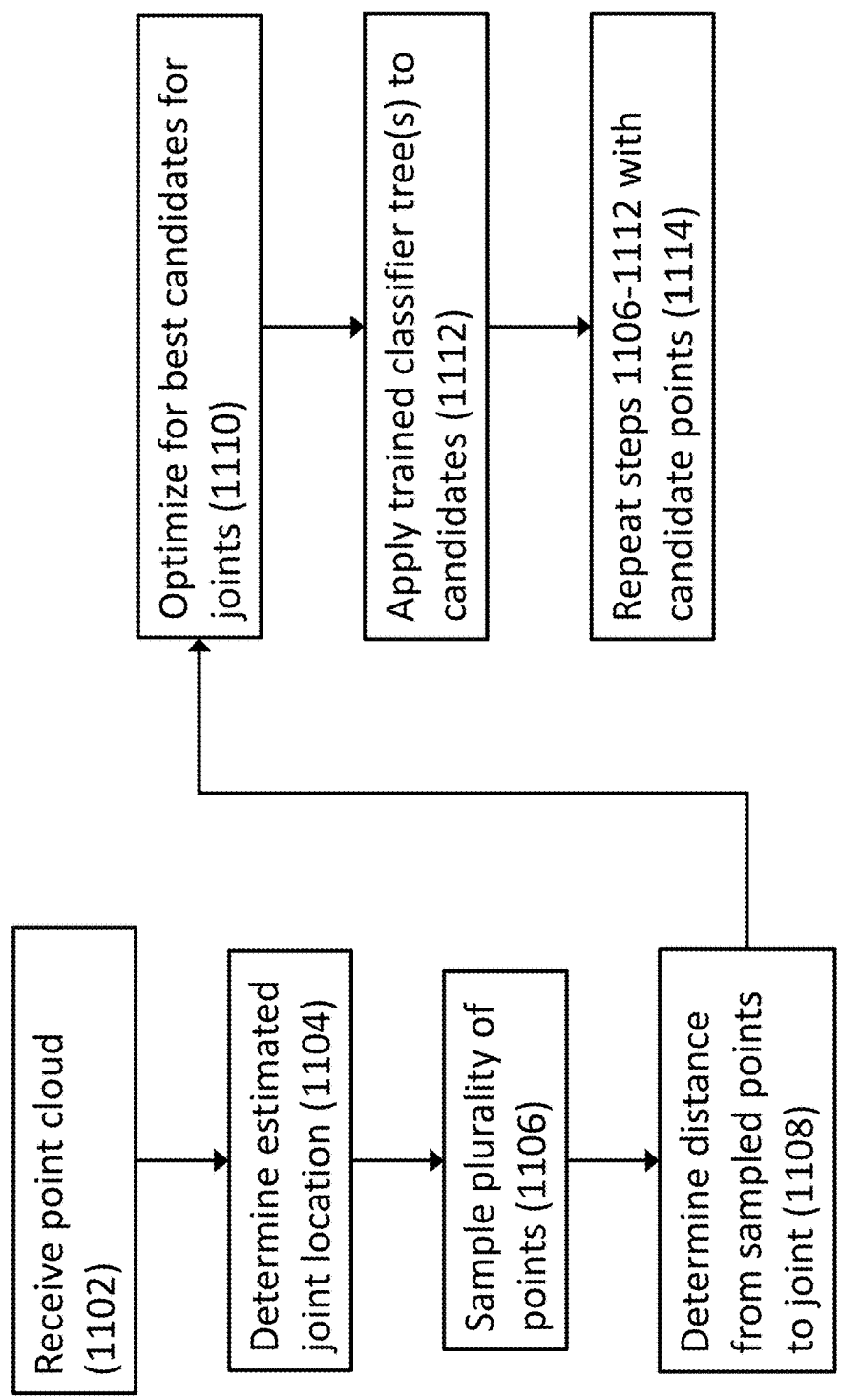
FIG. 11 shows a non-limiting example of a method for joint detection, according to at least some embodiments of the present disclosure.

FIG. 11 describes a non-limiting example of a method for joint detection, according to at least some embodiments of the present disclosure. As shown, the point cloud is received as input at 1102; the point cloud could optionally be generated as previously described. At 1104, an estimated location is determined for each joint. Preferably each joint is determined as a point in the point cloud, such that the estimated location relates to the location of the point that would correspond to that joint. For clarity, the joint locations are determined as vertices in the skeletal model, such that each joint is mapped as a discrete point (vertex) in the skeletal model. For the first frame, a mean position may be used from the training data determined from training the trees (as described in greater detail below), or from the template data. For subsequent frames, it is possible to use the position from the previous frame as an estimate. At 1106, a plurality of points close to the estimated location of the point corresponding to the joint is sampled. For example, the points can be sampled within a sphere having a particular radius from that point, such as 0.5 meter for example. Other distances are also possible, including any distance within a range from 0.005 meter to 2 meters, or 0.1 to 1 meter, and optionally any distance in between for example. The radius could optionally be different for each joint.

In terms of the mathematical representation of the sampled points, every candidate that is considered $c_{i,j}$ has a position $p_{i,j} \in \mathbb{R}^3$ that can be generated in a number of different ways. For a given joint j, candidate 3D positions can be generated for example as follows. Given training data of likely 3D poses of the skeleton, a multivariate 3D normal distribution of positions for every joint is estimated. A position can be generated by simply sampling a point from that distribution. This is optionally and preferably refined according to data from previous frames.

With regard to subsequent stages, assume the joints are indexed by integers $j \in J$, with J representing the set of all joints. It is also assumed that two trained trees are trained as classifiers or regressors in advance, described in greater detail below with regard to 1112. These two trees include a tree $T_{dist,j}$ that can estimate the distance |x-y|, as well as a tree $T_{offset,j}$ that can directly estimate the offset y-x to the joint. The training of these trees seeks to minimize a least-squares objective function. The trees can be trained as described with regard to "Random Tree Walk toward Instantaneous 3D Human Pose Estimation" by Jung et al., June 2015 CVPR conference (available from https://www.researchgate.net/publication/275771971_Random_Tree_Walk_toward_Instantaneous_3D_Human_Pose_Estimation).

At every leaf node of the tree $T_{dist,j}$, there is a set of distances. Once the distance tree has been traversed, a leaf node is reached where one takes the median distance at the leaf node to be the estimated distance. For the tree $T_{offset,j}$, clusters are computed at every leaf node. Once at a leaf node of that tree, one takes the mean position of a randomly selected cluster, with the probability of choosing a cluster being proportional to the number of samples in the cluster. At 1108, the distance from each of the sampled points to the estimated location is determined. Preferably, the distance is calculated by using a tree as follows. Several candidate positions for each joint whose position is to be estimated.

One assumes there are $N_1$ joints $j \in J$ with $J=\{1, \ldots, N_j\}$. For every joint, one generates $N_c$ candidates indexed by $C=\{1, \ldots, N_c\}$. Every candidate $c_{i,j}=(p_{i,j}, d_{i,j})$, with $i \in C$ consists of a position $p_{i,j} \in \mathbb{R}^3$ of the proposed position for a joint in the camera coordinate system, and a distance $d_{i,j} \in \mathbb{R}$ in meters which is an estimate of how far away the position $p_{i,j}$ is from the actual, unknown joint position. A distance of $d_{i,j}=0$ would mean that the candidate is a very good estimate of the true unknown 3D position. In other words, it is an estimated measure of how faithfully $p_{i,j}$ approximates the true unknown location. Let $r \in \mathcal{T}$ be a randomly generated number from a set of random numbers R. Let $f \in \mathcal{F}$ represent an input depth frame from a set of frames $\mathcal{F}$, consisting of pixels with a depth value associated with every pixel. One lets $S_{dirdist,j}: \mathbb{R}^3 \times \mathcal{F} \times \mathcal{R} \to \mathbb{R}^3$ represent the process of given a position $x \in \mathbb{R}^3$ using the tree $\tau_{dir,j}$ at that position to compute a direction q, and the tree $\mathcal{T}_{dist,j}$ at that position to compute a distance d, one obtains a new position y=x+dq. In other words, one can estimate the joint position y given some position x by first computing the direction towards the new position, then scaling that direction by an estimated distance, and finally adding it to the current position. So if one has a position x, one obtains the estimated position y as $y=S_{dirdist,j}(x,f,r)$ for a given frame f and random number r. The random number r is used to randomly select the cluster at the leaf node of the tree $\tau_{dir,j}$.

It is possible to also define $S_{offset,j}: \mathbb{R}^3 \times \mathcal{F} \times \mathcal{R} \to \mathbb{R}^3$ to represent the process of given a position x, estimating the offset $p \in \mathbb{R}^3$ using the tree $\tau_{offset,j}$, and then computing the estimated joint position $y \in \mathbb{R}^3$ as y=x+p. For every candidate position $p_{i,j} \in \mathbb{R}^3$, one estimates the distance $d_{i,j}$ to the true position by evaluating the tree $\tau_{dist,j}$ at that candidate position.

The optimization problem for determining the true location of the joint, and for selecting a candidate point, is then preferably performed at 1110. Optimization can be performed with regard to relative length constraints between each pair of joints and/or according to constraints on the angles. Step 1110 can be performed according to dynamic optimization, with relative length constraints between each pair of joints, as follows. For example, see the exemplary bone scaling method disclosed herein. Also, the skeletal model provides information about the range of lengths that are possible. The dynamic optimization algorithm then can solve the location of the candidate point representing a joint for each pair of joints, according to the relative lengths that are possible between each pair of joints, after which the algorithm determines a global solution. It is not necessary to consider all possible assignments, but only assignments for every pair of connected joints. To perform this calculation, templates for modeling the human skeletal structure are used. These templates can optionally be the previously described templates or alternatively may be obtained from http://h-anim.org/Specifications/H-Anim1.1/appendices.html#appendixa. The below described objective function is used, which takes an edge (distance between each pair of joints) and information from the template, and returns the distance between two joints in the template.

Specifically, the objective function may be defined as follows. One assumes that the joints are vertices of a tree-structured graph, connected by a set of edges $\varepsilon \subset \mathcal{J} \times \mathcal{J}$. Furthermore, one considers $N_t$ templates indexed by $t \in \mathcal{T}$ with $\mathcal{T}=\{1, \ldots, N_t\}$ and introduce a function $\mathcal{D}:\varepsilon \times \mathcal{T} \ T \to \mathbb{R}$ which provides the length in meters of an edge in the skeleton template. The solution of the optimization problem is a vector $I \in \mathcal{J}^{N_c} \subset \mathbb{Z}^{N_c}$ which is the index of the candidate associated with every joint, with $i_j$ representing the candidate index associated with joint j: $I=(i_1, i_2, \ldots, i_{N_j})$.

$$\underset{I\in \mathcal{J}^{N_c}, t\in \mathcal{T}}{\text{Minimize}} \underbrace{\sum_{j=1}^{N_j} d_{i_j,j}}_{\text{Data term}} + \alpha \underbrace{\sum_{(m,n)\in \varepsilon} \left| \underbrace{D((m,n),t)}_{\text{Template edge length}} - \underbrace{|p_{i_m,m} - p_{i_n,n}|}_{\text{Actual edge length}} \right|}_{\text{Edge length violation}} \qquad (18)$$

Regularization

The parameters that are to be optimized are the skeleton template index t and the vector I of candidate assignments for all joints. The left sum of the objective function is the data term of the optimization problem: For a candidate $i_j$ and a joint j, that estimated distance is $d_{i_j,j}$. The right sum of the objective function is the regularization term of the optimization problem: given a template t, for every edge (m, n) of the tree-structured skeleton, where m and n refer to joints, by how much the template distance D((m, n), t) is violated by the two positions $p_{i_m,m}$ and $p_{i_n,n}$ of the candidates. All solutions of the above optimization problem can be enumerated and the number of possible solutions is $N_c^{N_j} \cdot N_t$.

The alpha parameter is heuristically determined and has been found to have useful values particularly between 0.4 and 1. Alpha is set higher for noisy data, and lower for clean data. The alpha term is at least 0.001 for clean data. To solve the optimization problem in a computationally manner, because of the tree-structure of the skeleton, it is possible to use the dynamic optimization approach to compute the global optimum in a reasonable amount of time, as noted above. One non-limiting example of a suitable dynamic optimization method that could be applied to this problem is described in Felzenszwalb, Pedro F., and Ramin Zabih. "Dynamic programming and graph algorithms in computer vision," *IEEE Transactions on Pattern Analysis & Machine Intelligence*, vol. 33, no. 4 (2011): 721-740 (available at http://www.cs.cornell.edu/~rdz/Papers/FZ-survey.pdf).

At 1112, optionally at least one trained classifier tree is used to assess the appropriateness of each candidate point as representing the location of the joint. Preferably, the trees are trained to determine a direction from a point to a joint and also to estimate the distances from a given 3D position to a particular joint location. The trees can be used to determine, for each candidate position, how good the candidate is for explaining the actual location of the joint. Two different sets of trees, in some embodiments, can be used as previously described. Since direction alone doesn't determine how close a candidate is to a particular location, in some embodiments, distance trees are also used. Optionally, the trees can be trained such that, given a particular data point, how close is that point to a particular joint. With respect to the notation used herein, the assignment is further refined by applying either $S_{dirdist,j}$ or $S_{offset,j}$ to that position, or preferably both, in order to obtain a position which could be closer to the true joint position.

Optionally, at 1114, the candidate points can be used as features to a second process for refinement, to better localize the joints. Optionally, steps 1106-1112 of the algorithm can be repeated but with these candidate points as the initial estimates (according to some embodiments). The process can optionally be repeated more than once, optionally with additional, different features.

Also optionally, the initial training process for training the previously described trees could be improved from the method described in "Random Tree Walk toward Instantaneous 3D Human Pose Estimation" by Jung et al., June 2015 CVPR conference (available from https://www.researchgate.net/publication/275771971_Random_Tree_Walk_toward_Instantaneous_3D_Human_Pose_Estimation). The feature used for partitioning the training samples was determined as shown in equation 6 of that paper:

$$f_\theta(F, x) = d_F\left(x + \frac{t_1}{d_F(x)}\right) - d_F\left(x + \frac{t_2}{d_F(x)}\right) \quad (19)$$

where F is the current frame, $x \in \mathbb{R}^3$ is the $3^{rd}$ position where we evaluate the feature, $d_F(x)$ is the image depth at x and $t_1 \in \mathbb{R}^3$ and $t_2 \in \mathbb{R}^3$ are the two offsets.

A new feature $f_\theta^1$ can be added, for example, as follows, assuming that the current position has components $x_1$, $x_2$ and $x_3$, that is $x=(x_1, x_2, x_3)$, thereby comparing the depth of the current point with the depth at some random nearby point:

$$f_\theta^1(F, x) = d_F\left(x + \frac{t_1}{d_F(x)}\right) - x_3 \quad (20)$$

where $t_1 \in \mathbb{R}^3$ is a random offset.

A further refinement could optionally feature training a new set of trees that also include previous estimates. This would include a feature:

$$f_{u,j}^2(x) = u \cdot (x - p_j^*) \quad (21)$$

where $u \in \mathbb{R}^3$ with $|u|=1$ is a randomly chosen unit vector, j is the joint index, $x \in \mathbb{R}^3$ is the position where one evaluates the feature and the symbol "." represents the dot product of two vectors. In other words, this feature computes the offset with a given point $x \in \mathbb{R}^3$ and a previous estimate $p_j^*$ of that point to obtain a feature which takes previous knowledge into account. This can be used to train trees as before using both this new feature for different joints j and random unit vectors u, in addition to (or in place of) the features provided in the previously described paper.

For a given frame, first position $p_j^*$ is detected using the trees that were trained. Then the algorithm is rerun, but using the second set of trees that were trained, which in addition to image data also uses the detections $p_j^*$ for the second feature. This refined position can be used as a new input feature and then to obtain for every joint an even better refinement $p_j^{*3}$. It is possible to repeat this process as many times as desired. If one performs this process n times, for every joint j there will be a position $p_j^{*n}$.

Without wishing to be limited by a single hypothesis, the method of FIG. 11 has a number of advantages over "Random Tree Walk toward Instantaneous 3D Human Pose Estimation" by Jung et al., June 2015 CVPR conference (available from https://www.researchgate.net/publication/275771971_Random_Tree_Walk_toward_Instantaneous_3D_Human_Pose_Estimation) or according to the description provided in "Efficient Human Pose Estimation from Single Depth Images" by Shotton et al., 2011 (available from https://people.eecs.berkeley.edu/~rbg/papers/pose-from-depth-pami-pdf), or a combination thereof. The method described in the Jung et al. paper suffers from a number of disadvantages, including with regard to the core random walk algorithm, which tends to diverge significantly from the actual desired fitted model. The method described in the Shotton et al. paper requires each pixel to vote on a particular location, first to determine background as opposed to the subject, and then to determine the location of each joint within the subject, as the points are determined as offset from the joints; this method is computationally very expensive.

Optionally, according to at least some embodiments, there is provided a Kalman filter for increasing the efficiency of the tracking system. For example, and without limitation, the application of the Kalman filter may increase the efficiency to a rate of 60 body poses per second. Without wishing to be limited by a single hypothesis, the Kalman filter provides body pose estimates at a higher rate than the underlying reconstruction algorithm, through extrapolation of historical data.

For every pose reconstructed by the underlying algorithm, the pose is encoded on the following form. The skeleton of the body is modeled as a rooted tree, where every joint of the body pose is a node in this rooted tree. The 3D translation of the body pose with respect to the world coordinate system is encoded as a 3D translation $t \in \mathbb{R}^3$ of the root node of the skeleton. For every joint i, a quaternion $q_i$ encodes an orientation. For the root node i=0; that quaternion corresponds to the rotation that when applied to joint coordinates transform those coordinates to world coordinates. For all other joints, the rotation is the rotation that, when applied to a vector in the coordinate system of that joint, will transform that vector the coordinate system of the parent joint. Every joint, except for the root joint, also has a fixed origin in the coordinate system of its parent joint. But that origin is constant and not variable. To summarize, there are 3 parameters that encode the translation of the body, and then 4 quaternion parameters for every joint of the body. If there are N joints, there are a total of 3+4N parameters that encode the body pose.

A non-limiting example of the algorithmic flow of the filtering is now described. There is a body filter B, an underlying reconstruction algorithm R and queue G.

The body filter is a stateful object that will be referred to as B. It has two operations: update and predict. Updating the body filter means providing the body filter with a recent body pose together with a time stamp when that body pose was produced. Updating the body filter means that the internal state of the body filter is also updated to reflect the knowledge of the new body pose and the time when it was produced. Prediction means predicting the state of the body pose at an arbitrary time, after the time of the last update. This means using the internal state of the body pose to extrapolate an approximate body pose at a given time. The body filter is updated whenever a new body pose is reconstructed by the underlying reconstruction algorithm. A new body pose is predicted as necessary. The two operations, update and predict, are mutually exclusive so that consistent results are obtained even if the two operations are called simultaneously on the same filter B from different threads. Both operations are also relatively computationally cheap in comparison to reconstructing the body pose using R.

Whenever a set of new data arrives, such as a frame from the camera, that data is enqueued on the queue G. Currently, this queue G has a maximum size of 1 element. If we enqueue an element on that queue and there is already an element in the queue, the element already present is replaced by the new element that is enqueued.

In a separate thread, there is a loop that (i) either pops the last element from the queue G or waits for an element to be put on the queue, that it then pops, then (ii) feeds the data just popped from the queue to the reconstruction algorithm R that uses this data to reconstruct a body pose. Once a new body pose has been reconstructed, the body filter B, is updated with the reconstructed body pose and a time stamp of when the input data was acquired by the sensor, e.g., the time of flight camera.

The body filter B permits prediction of a body pose at any time later than the last update of the body filter. Prediction is computationally cheap and can, for instance, be done whenever it is necessary to render a new body pose on the screen.

Here the implementation of the body filter B mentioned in the previous section is described in an algorithm overview.

There is one Kalman filter for every parameter vector that is used to encode the body pose. There is one Kalman filter to filter the global translation t and one Kalman filter for each quaternion $q_i$ of every joint i. For a body pose with N joints, there are N+1 Kalman filters. The filtering takes place in multiple threads. Every time the body filter B is updated with a new body pose, every Kalman filter is updated with its respective parameters of that body pose. Every time a new body pose is predicted from B, the Kalman filter predicts the associated parameters.

Every Kalman filter has a dimension n, which is 3 for the body translation filter, and 4 for the joint rotation filters. A counter j keeps tracks of how many times the filter has been updated. The following variables represent the state of the filter after j updates.

A state vector $x_j$ of dimension $2n$ after the filter has been updated j times. The first n dimensions of this vector are an estimate of the state being tracked. The remaining n dimensions are an estimate of the rate-of-change of those parameters. In this case, the state that is estimated corresponds to the observations: for the translation filter, the filter is updated with a translation reconstructed by R and the state that is reconstructed is also a translation. For the joint rotation filters, we update each filter with a quaternion and the state that the filter estimates is also a quaternion.

A state covariance matrix $P_j$ holds the covariance of the state parameters after the filter has been updated j times. The matrix $P_j$ is a square symmetric positive semidefinite matrix of size 2n.

A time stamp $T_j$ of the last observation j is the time in seconds elapsed since a historical point in time e.g., when the filter was instantiated.

Every Kalman filter has a set of parameters $A=(a_{state}, a_{rate}, a_{obs})$, where $a_{state}$ is an estimate of the standard deviation of the state that is being estimated, and corresponds to the first n parameters of x. The $a_{rate}$ parameter is an estimate of the standard deviation of the rate of change of the state, and corresponds to the last n parameters of the Kalman filter. The $a_{obs}$ parameter is an estimate of the noise in the observation that is used to update the Kalman filter.

There are a few constants that remain the same: Q is a 2n×2n diagonal matrix that represents the state estimate covariance. Its upper left n×n submatrix is a diagonal matrix where every element is set to $a_{state}^2$.

The lower left n×n part is a diagonal matrix where every element is $a_{rate}^2$.

The W matrix is an n×n diagonal matrix that represents the observation covariance, with every diagonal element being $a_{obs}$. The matrix H is a n×2n matrix whose left part is an n×n identity matrix and all remaining elements are 0.

Upon instantiation of a Kalman filter with j=0, the matrix P0 is set to Q. Every time the full body filter B is updated, every Kalman filter is updated with its part of the parameters of the body pose. Those parameters are an observation $z_j$ and they have dimension n. On the first call to the Kalman filter, the first n elements of the state $x_0$ are initialized to be $z_j$. The remaining elements of x are set to 0.

For the remaining updates 1<=j, for every observation vector $z_j$ that arrives, the time difference $D_j=T_j-T_j-1$ is calculated in seconds to the time before when the filter was updated. A model matrix $F_j$ of size n×2n is constructed whose left n×n is an identity matrix. The right n×n matrix is a diagonal matrix with every element set to T. The state is predicted as $x_{pred,j}=F_j^T*x_{j-1}$.

A matrix is constructed: $P_{pred,j}=F_j^T P_j F_j + Q$.

The observation is predicted as $z_{pred,j}=Hx_{pred,j}$.

The prediction error is $y_j=z_j-z_{pred,j}$.

The uncertainty in the predicted state, represented as a covariance matrix $P_{pred,j}$, can be propagated to an uncertainty in the predicted observation: $S_j=HP_{pred,j}X^T+W$.

Then the following is computed: $K_j=P_{pred,j}H^T S_j^{-1}$.

Finally, the state vector $x_j$ and the state covariance matrix $P_j$ are updated. If the state vector contains a quaternion, it is necessary to renormalize: $x_j=C(x_{pred,j}+K_j y_j)$.

The function that normalizes: $C:\mathbb{R}^n\to\mathbb{R}^n$ is defined as:

$$C(x) = \frac{x}{|x|}.$$

Otherwise, if filtering a translation, no normalization is needed: $x_j=x_{pred,j}+K_j y_j$.

The covariance is updated as: $P_j=(I-K_j H)P_{pred,j}$.

Kalman filter prediction is performed as follows. As needed or desired, at a given time T and after j filter updates to obtain a prediction k of the parameters being filtered, $x_{0j}$ is the first n parameters of $x_j$ and $x_{1j}$ is the last n parameters of $x_j$. For quaternions, the prediction needs to be normalized: $k=C(x_{0j}+(T-T_j)*x_{1j})$.

Otherwise, no normalization is needed: $k=x_{0j}+(T-T_j)*x_{1j}$.

In accordance with preferred embodiments, a jitter filter can also be provided. Preferably, such a jitter filter is a dead band jitter filter for removing the appearance of jitter in tracking avatars. In motion tracking systems, inaccuracies in tracking can cause the avatar of the tracked person or object to jitter when the tracked person or object is not actually moving or moving slowly. This problem can be exacerbated when there is a flat, close-to-uniform surface (e.g., a table) near the jitter body part or object. Typical prior art systems adjust tracking to reduce jitter by averaging point locations and either the input raw data is filtered (the camera images) or the tracking itself has implicit filtering (for instance a Kalman-based tracker). Other systems must also take into account more information (for instance, temporal filtering) than is required by embodiments in accordance with the present disclosure.

The inventors surprisingly have found a more elegant solution, which is to preferably filter all movement—to show no movement—in the avatar or virtual object if the motion detected is less than a certain threshold. Applying jitter filters in accordance with the present disclosure reduces considerably the jitter and improves the user experience. A clear advantage is that it applies on the final elements of the system (the skeleton joints) and filters in the same space that those elements work on (embodiments in accordance with the present disclosure can filter quaternions in rotation joints, or translations in translation joints).

Tables and other flat surfaces (i.e., flat, uniform plane or surface, which can also mean a close-to-uniform plane or surface) may add to noise, which when mapped from the point cloud onto the avatar (representation of the user), causes trembling of the avatar hands for example, or other inaccurate movements of the avatar. The uniform surface can be segmented out, preferably without calibration or during calibration. Points from the uniform surface can be removed as table model or "table bone." Then, if it is determined that a point is explained by the table or is from the table, then it can be removed. If the point is explained by the body or from the body, then it can be kept. As part of the solution, it becomes acceptable to get rid of some hand points because when hands are on the table, the markers are very visible. To remove the plane, a probabilistic model is used, not RANSAC.

Due to the input noise of the depth sensor the final pose estimated during tracking may suffer from jitter, despite the temporal regression that is part of the tracking objective function. To alleviate jittering, preferred embodiments post-process the pose parameters with a dead band filter that suppresses all motion if the movement with respect to the previous frame falls under a certain threshold. Preferred embodiments can apply it to the orientation of one or more bones as well as the translation of the root bone. For the case of the orientation we formulate it as follows:

$$q_n^t = \begin{cases} q_n^t; & d(q_n^t, q_n^{t-1}) < \theta \\ \text{slerp}(q_n^t, q_n^{t-1}, \alpha): & \text{otherwise} \end{cases} \quad (22)$$

The orientations are modeled as quaternions q for each bone n. The distance function d refers to the angle between the current and the last frame orientation. The slerp function interpolates over two quaternions, and the interpolating factor $\alpha$ is computed as the ratio:

$$\frac{d(q_n^t, q_n^{t-1}) - \theta}{\theta}.$$

The case of the translation is analogously formulated but instead of quaternions, preferred embodiments linearly interpolate the 3d location of the root bone and the function d is modeled as an Euclidean distance.

In preferred embodiments, modules configured to perform tracking analysis can also be configured to filter jitter. For example, in preferred embodiments, tracking engine 112 can be configured to perform jitter filtering or include a jitter filter, according to any of the methods described above. In other preferred embodiments, another module can perform jitter filtering or include a jitter filter. Tracking engine 112 can include a specific jitter filter module or one of the above disclosed modules within tracking engine can implement a jitter filter.

Figure 12:
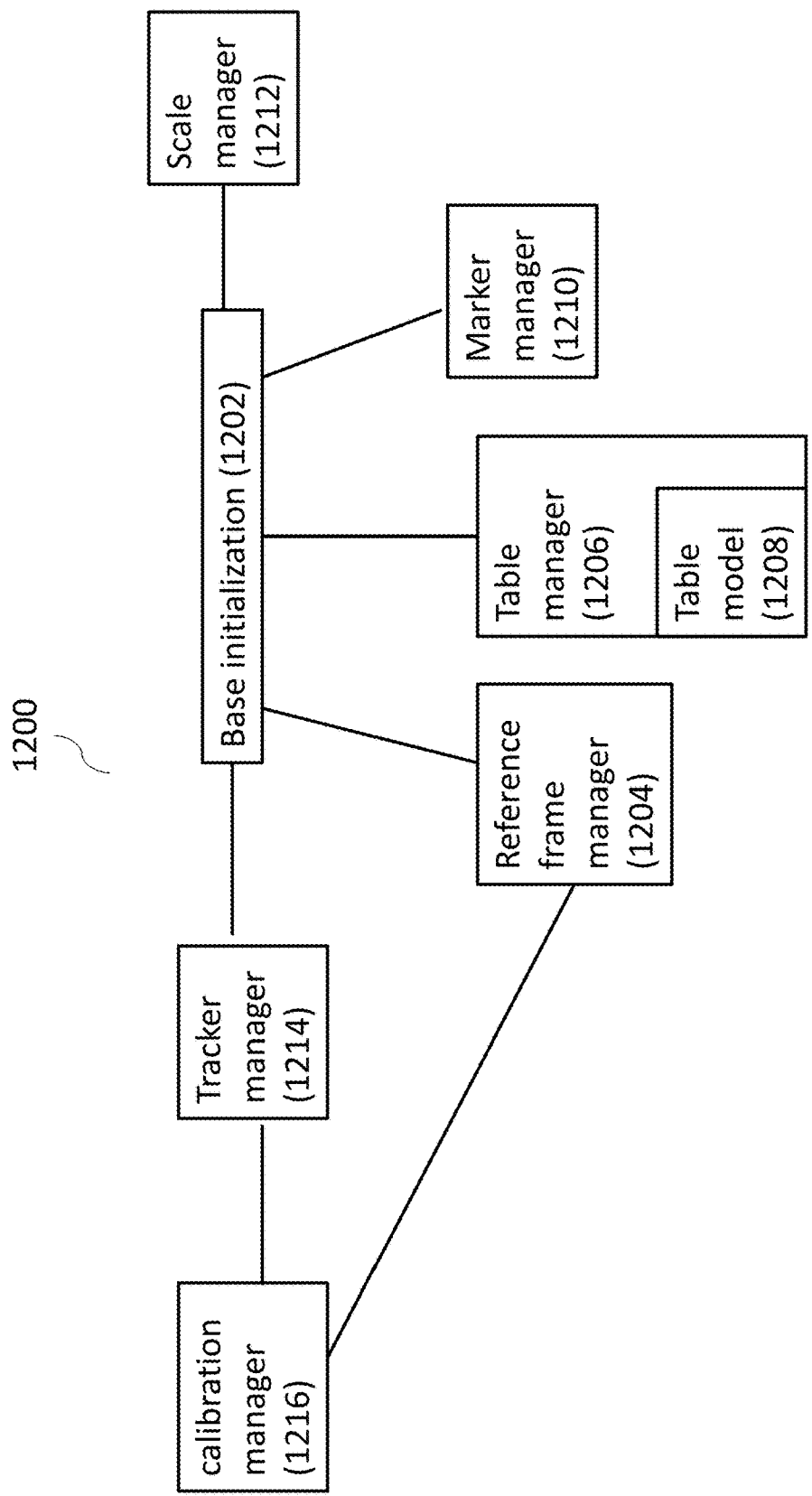
FIG. 12 shows a non-limiting, exemplary system for calibration, according to at least some embodiments of the present disclosure.

FIG. 12 shows a non-limiting, exemplary system for calibration, according to at least some embodiments of the present disclosure. As shown, a system 1200 features a base initialization module 1202, which handles initialization and calibration. A reference frame manager 1204 determines the reference frame for the RGB camera, in order to be able to assess the visual information being provided. Reference frame manager 1204 may optionally also determine the reference frame of the depth sensor, such as a TOF (time of flight) sensor. As described in greater detail below, reference frame manager 1204 receives calibration information from a calibration manager 1216 in order to be able to determine the frame of reference. Reference frame manager 1204 then provides the reference frame determination to base initialization module 1202.

Next a table manager 1206 locates a table or other furniture (such as a bed or chair for example), or any other inanimate object, which is within the visual detection area of the subject. Table manager 1206 uses a table model 1208 (which may optionally relate to any inanimate object) to segment out the table or other inanimate object, in order to prevent artifact generation from detection of such an inanimate object.

Base initialization module 1202 is also in contact with a marker manager 1210, which locates any active or passive markers that may be attached to the subject or patient being tracked. As described in greater detail above, such markers may optionally include without limitation lights (such as LED lights for example), inertial markers, magnetometers, passive visual markers and the like. In order for the calibration process to be performed, marker manager 1210 locates the markers attached to the subject or otherwise in the environment. In case of markers which require specific placement on the subject, for example at particular locations or body parts, marker manager 1210 also verifies that these markers have been correctly placed, at least relative to each other.

A scale manager 1212 then determines the relative size of the subject, for example according to the positions of the detected markers with respect to the model markers.

Once the various components of the system have been located, a tracker manager 1214 initiates calibration of all components so as to be able to track the subject. Calibration is performed through calibration manager 1216, which performs the calibration process as described with regard to FIGS. 13A-13D below.

Figure 13A:
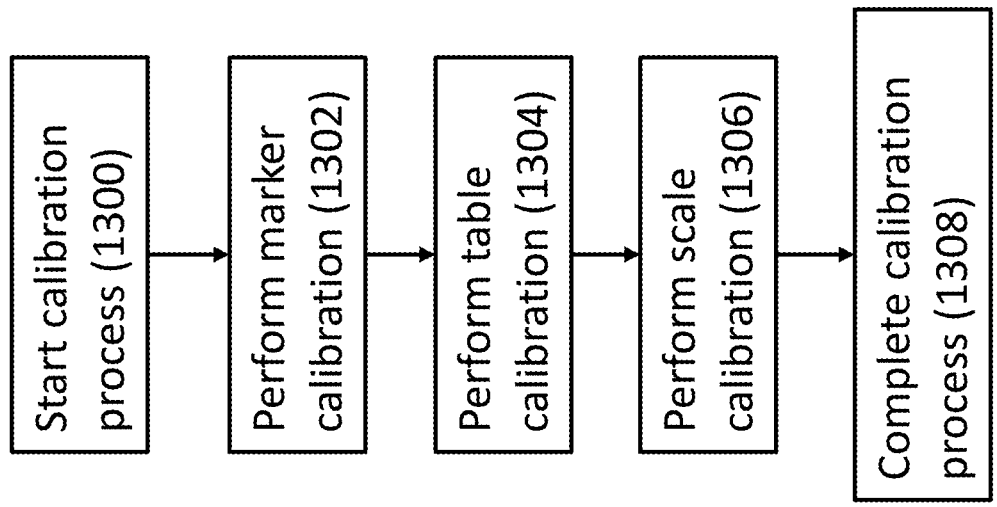
FIGS. 13A-13D show non-limiting, exemplary methods for calibration, according to at least some embodiments of the present disclosure.
Figure 13B:
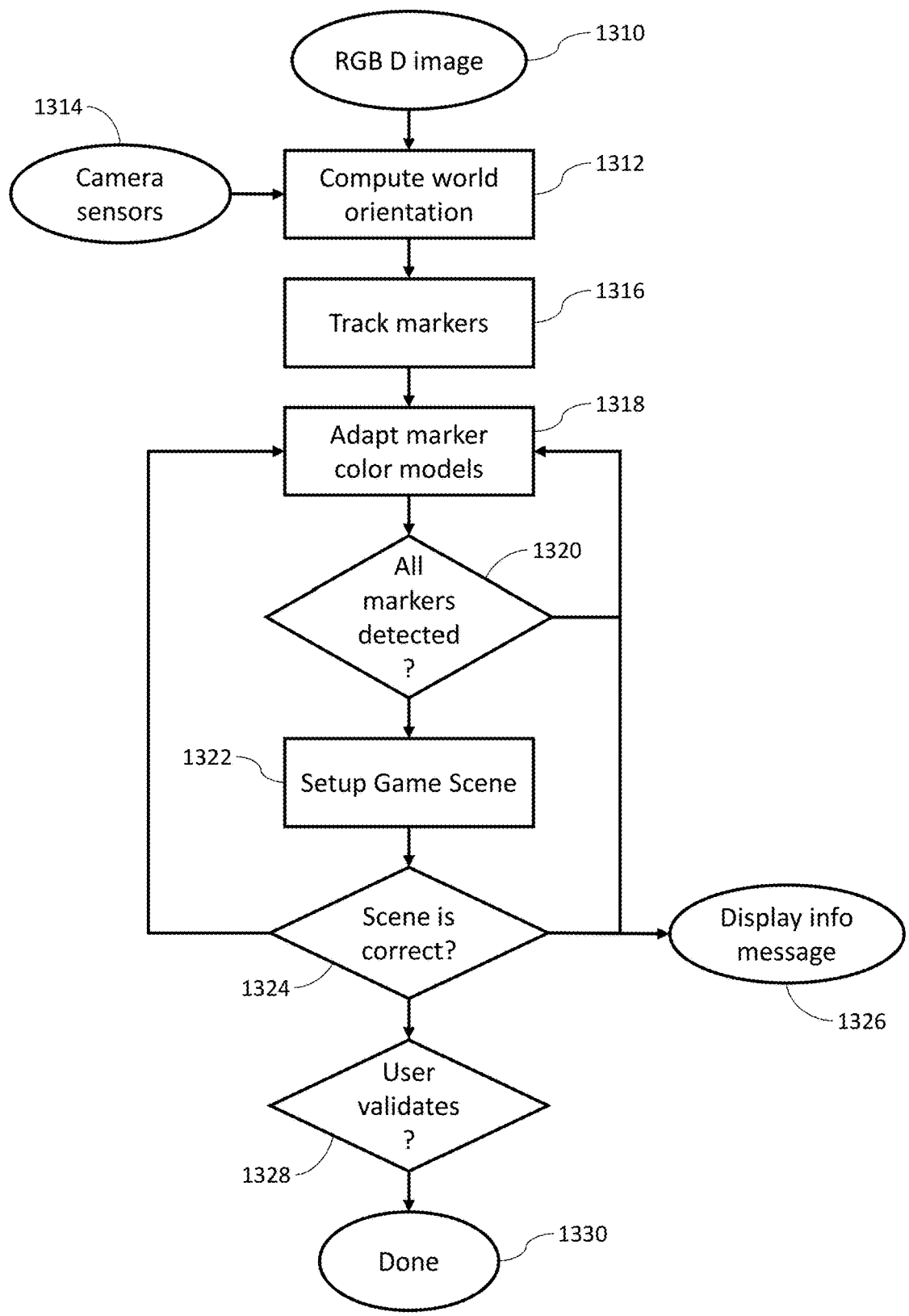
Figure 13C:
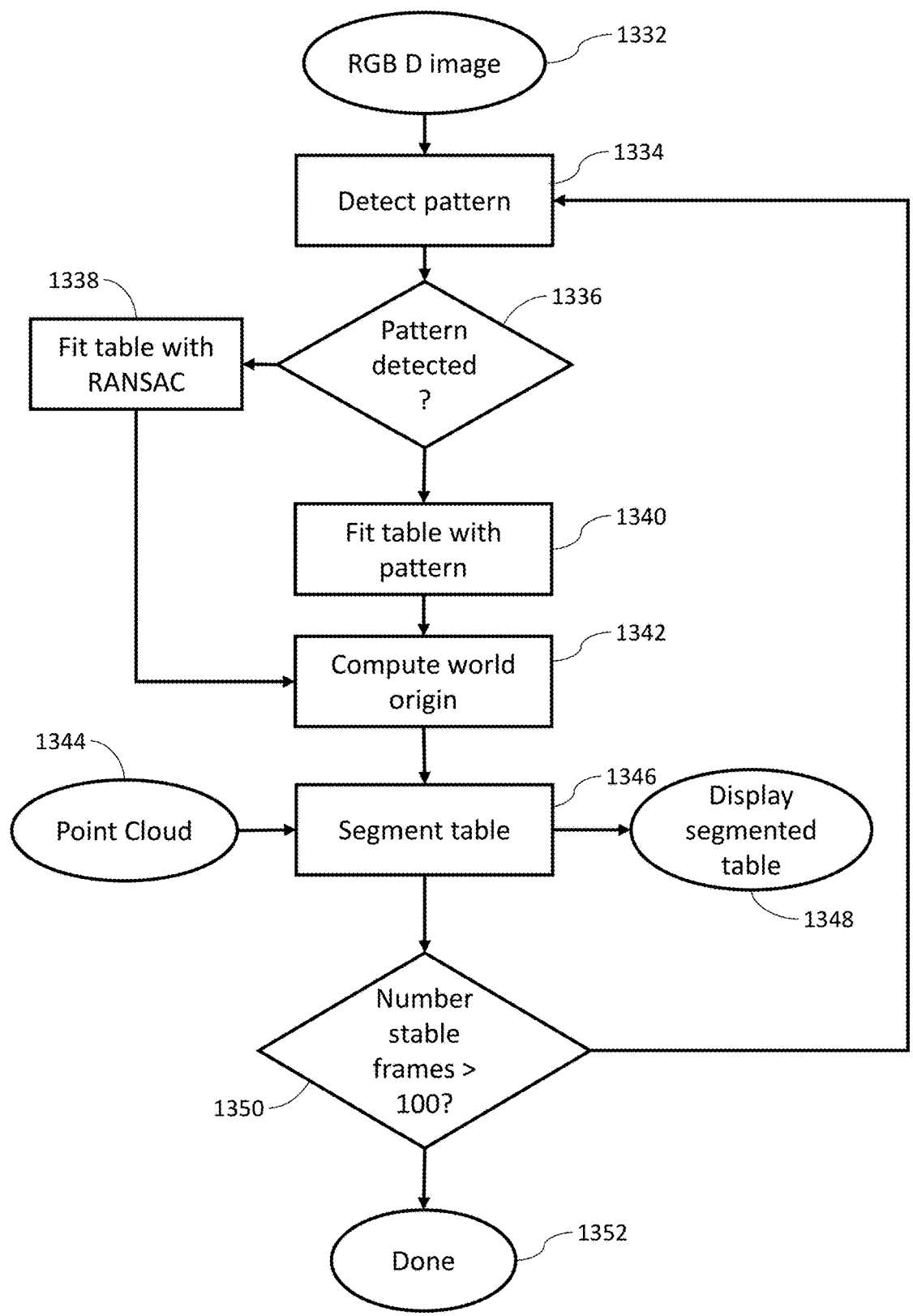
Figure 13D:
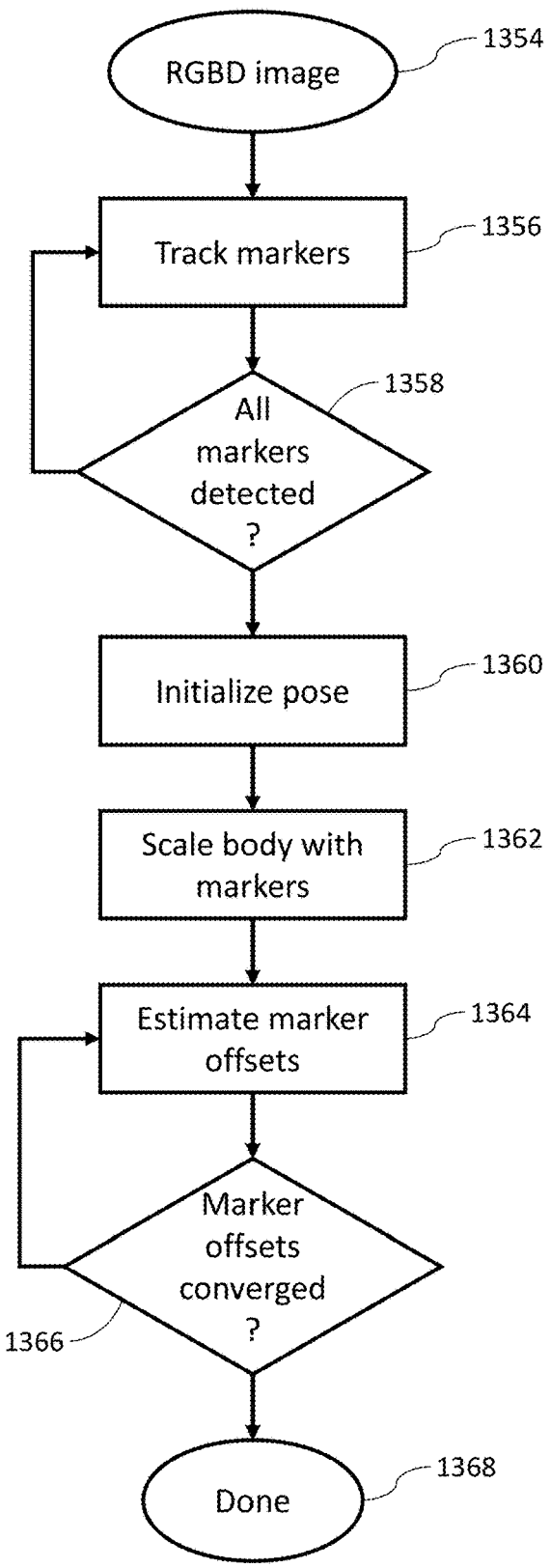

FIGS. 13A-13D show non-limiting, exemplary methods for calibration, according to at least some embodiments of the present disclosure. FIG. 13A shows the overall exemplary calibration process, while FIG. 13B shows the process for marker calibration, FIG. 13C shows the process for table (inanimate object) calibration and FIG. 13D shows the process for scale calibration.

Turning now to FIG. 13A, as shown the calibration process starts at stage 1300. Next, at stage 1302, marker calibration is performed. As described in greater detail below, this stage includes detecting the markers, and if particular place of the markers is required, determining their relative placement to each other.

Table (inanimate object) calibration is performed at stage 1304. As described in greater detail below, this stage includes detecting one or more inanimate objects, such as a table, and then segmenting them out of the subsequent tracking process, to avoid generation of artifacts.

Scale calibration is performed at stage 1306. As described in greater detail below, this stage includes determining the relative scale of each limb by comparing the detected markers with the model markers. The global scale of the model is then preferably inferred as well optimizing a single scale parameter on the same tracking cost function.

Once these separate calibration processes have been performed, the calibration process ends at 1308.

Turning now to FIG. 13B, the marker calibration process is optionally performed as follows. In stage 1310, an RGBD image is preferably obtained, featuring color (optical) data (RGB) and depth data, for example from a TOF sensor. The optical data is preferably synchronized with and calibrated to the depth data.

Next in stage 1312, the transformation from the optical and/or TOF sensors frame of reference to the world frame of reference is computed. Preferably this process is supported by receipt of data from camera sensors in stage 1314, for example in regard to their relative orientation.

The process of tracking the markers is then started in stage 1316. Data from each marker is preferably detected. For example, if the markers are LED lights, then each LED light is preferably detected. If the markers are colored, for example as colored lights, then preferably each color of each marker is detected in stage 1318. The detected colors of the markers are then preferably mapped to the stored color information, so that the color of each marker can be correctly detected, as part of this process.

In stage 1320, the calibration process is preferably continued until all of the markers have been detected and mapped. In stage 1322, the game scene is set up which consists of determining if the patient has enough free movement space as well as making sure that the position/orientation of the camera relative to the patient allows a correct and comfortable user interaction.

The calibration process is preferably continued in stage 1324 until the game scene has been correctly set up. This information is then displayed to the user in stage 1326, who then has the option to determine that the game scene (or some other aspect of the calibration) is not set up correctly and to return to the initialization of calibration. If the scene is correctly set up and the user verifies in stage 1328, then the process may end in stage 1330.

Stages 1318-1328 are optionally repeated at least once during the process of tracking the movements of the subject.

FIG. 13C shows the process for table (inanimate object) calibration. Although the example is described with regard to a table, it is understood that the process would be operative for any inanimate object or combination thereof. Step 1332 begins as for step 1310 of FIG. 13B, in which an RGBD image is obtained. At 1334, a pattern search is performed to check for one or more inanimate objects, which for this non-limiting example is a table. Optionally the patterns of tables, or the descriptive parameters relating to tables, are stored in a database for the pattern search.

At 1336, a table pattern is detected. The optical and/or depth data relating to this pattern is then optionally fit with a suitable algorithm, such as the previously described RANSAC algorithm for example, at 1338. In addition, the table is also preferably fit to one of the predetermined patterns as previously described, at 1340. The combination of the output of 1338 and 1340 may then optionally be used to compute the world origin of the environment relative to the table in stage 1342. At 1346, this computation enables the table to be segmented out of the calculations, to avoid artifacts. Preferably the segmentation is performed relative to the received point cloud data from 1344. The segmented table is then optionally displayed at 1348, for example to enable the user to determine whether the table has been correctly segmented.

At 1350, the process is optionally repeated, for example until a certain number of stable frames or a stable time period has elapsed, and/or after such a number of stable time frames or stable time period. At 1352, optionally after one or more predetermined criteria have been met regarding the table segmentation, the calibration process for the table may be complete.

FIG. 13D shows the process for scale calibration. Steps 1354 (obtaining RGBD image), 1356 (tracking markers) and 1358 (marker detection) are optionally performed with regard to FIG. 13B. Steps 1356 and 1358 are optionally repeated until all markers are detected.

Step 1360 includes pose initialization, which relates to the initial determination of the location and position of the subject being tracked. At 1362, the body of the subject is scaled according to the relative locations of the markers. At 1364, the offsets of the markers are determined. At 1366, the marker offsets are converged. Steps 1364 and 1366, optionally with step 1362, are repeated until the body scale and relative marker positions have been determined. The process then ends at 1368.

According to at least some embodiments, optionally the markers being tracked are hybrid markers. Such hybrid markers may optionally include a combination of different types of active markers (for example, optical and inertial), and/or a combination of active and passive markers (for example, optical and/or inertial, and joint detection or another type of passive marker).

Preferably, with hybrid markers, all joints can be tracked. Confidence could also be associated with orientations and not only joint positions.

A given joint location may be the result of a marker detection (that already brings a confidence with it), due to a point-cloud, or both. Optionally, the probability of a location being correct is scaled, for example to a range such as the range −100,100. When representing tracking/detection confidence in such a range, optionally c (confidence) is determined relative to the probability of detection (p(detection)) as follows:

$c=-100 \to p(detection) \sim = 0.00001$
$c=-80 \to p(detection) \sim = 0.0001$
$c=-60 \to p(detection) \sim = 0.001$
$c=-40 \to p(detection) \sim = 0.01$
$c=-20 \to p(detection) \sim = 0.1$
$c=0 \to p(detection) = 0.5$
$c=20 \to p(detection) \sim = 0.9$
$c=40 \to p(detection) \sim = 0.99$
$c=60 \to p(detection) \sim = 0.999$
$c=80 \to p(detection) \sim = 0.9999$
$c=100 \to p(detection) \sim = 0.99999$ Optionally the special value NOT_TRACKED relates to the situation in which the joint is never tracked. For example if the system is configured to track only the human upper-body then, during tracking, requesting information about the joints of the legs would result in a NOT_TRACKED value. Another non-limiting example of this situation would be if the tracking system (or a particular module within the system) is configured to track only hands. In that case, requesting information of any joint not belonging to the hands (neck, head, shoulders, etc.) would result in a NOT_TRACKED value. This division allows the system to explicitly set-up and track an arbitrary subset of joints of an complete skeleton, enabling several use-cases, including but not limited to, specific body part tracking, or tracking amputee users.

Optionally the special value NOT_DETECTED relates to the situation in which the value is not reliably detected (e.g., one hand is occluded and was not detected), but could theoretically have been, given the available sensors.

Optionally, confidence could be expressed in terms of a 32 bit integer value that stores in its upper 16 bits the flag code and its lower 16 bits the value of the confidence. Having a separate bit-set flag would support communication of situations such as joint occluded, tracked, with confidence 30%. Optionally, the ranges of the confidence could be changed to 0-100 in order to have a more intuitive probabilistic interpretation as int(PROB*100)

In either situation, the confidence is based on the probability of a detection ("Probability that the detection of X is a true positive").

The confidence is linked to the probability through a logit function such as for example $c=20*\log\_10(p/(1-p))$. The confidence is bounded to the interval $[-100;100]$. A special value "not detected" (current value: $-101$) may optionally have an equivalent meaning with the lowest possible confidence. A special value "not tracked" (current value: $-102$) can be used to signify that the tracking algorithm is not aware of the particular joint/item being asked about.

Computing Bone Confidences from the Point Cloud:

The confidence of a certain bone/joint given a point cloud is optionally computed as follows:

$$\text{confidence}(b) = \sum_v \alpha(b, v) \sum_p \text{post}(v, p) \text{conf}(p) \quad (23)$$

where b refers to a bone, v refers to a skin vertex, and p refers to a point of the cloud. The matrix alpha indicates the blending weights and the matrix post the posteriors.

Finally the function conf(p) returns the confidence of a point p of the cloud. The idea is that each point of the cloud has a confidence associated (this confidence can be set to a default value or inferred from the raw camera data), and the confidence of a bone is accumulated in two steps: first, how strongly a vertex is influenced by a point, and then how strongly the bone is influenced by that vertex.

Computing Bone Confidences from the Hybrid Cloud:

Without loss of generality the same formula can be applied to compute confidences based on marker detections, where the function conf(m) refers to the confidence of a marker detection m instead, and the vertices v correspond to the locations in the body where the markers are placed.

To combine both confidences within the joints, a max operator is used: conf_bone_b=\max(conf_b_cloud, conf_b_markers) so that if a marker is present in the cloud influencing a given bone with high confidence, the bone confidence will ultimately be the one of the markers.

Computing Joint Confidences from Bone Confidences:

Since the confidences are preferably expressed in terms of joint confidences rather than bone confidences, the bone values are mapped to joints, in such way that a joint that is shared between K bones has a confidence that is the average of the confidence of those K bones.

Figure 14A:
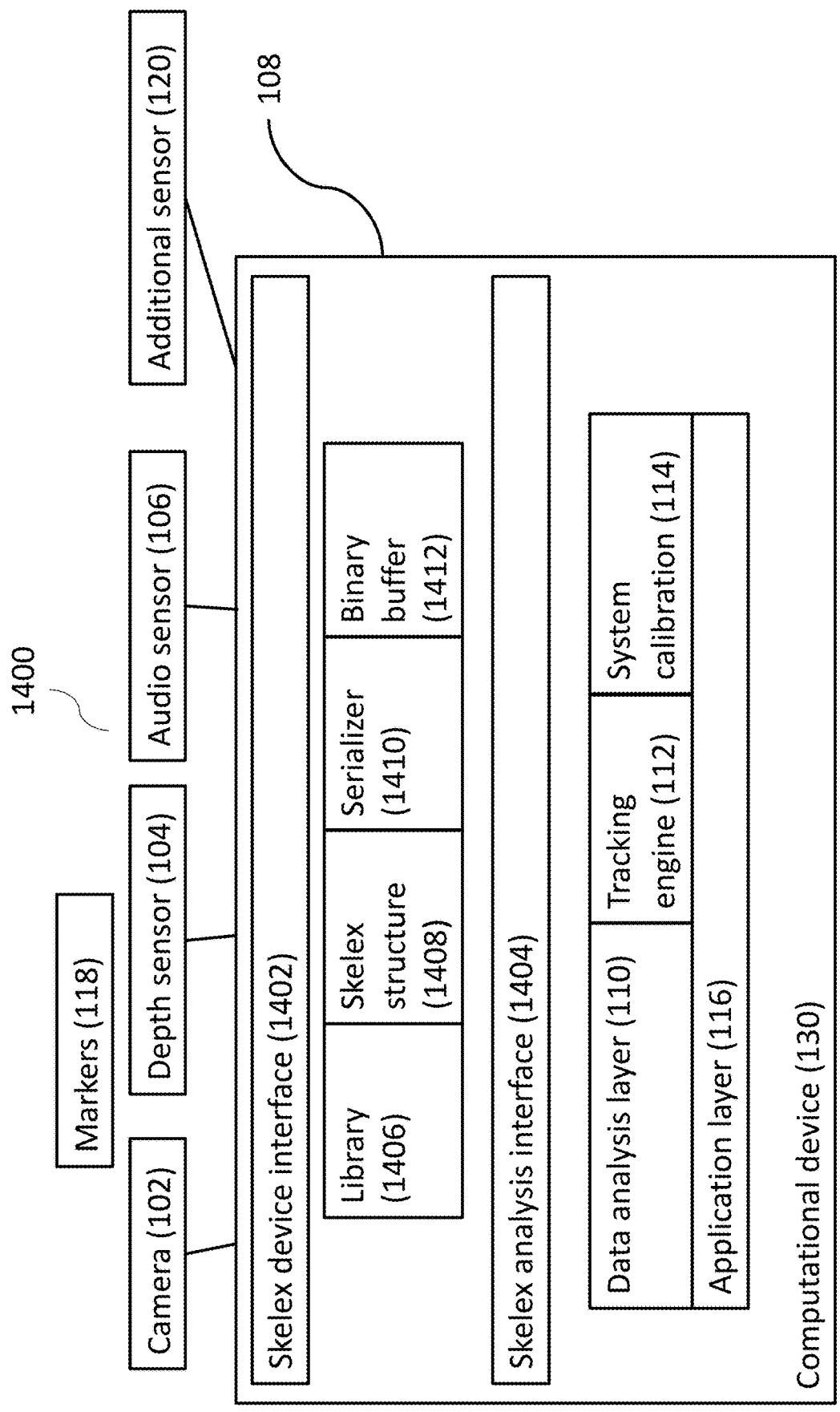
FIGS. 14A-14G relate to a non-limiting implementation for tracking abstraction with a skeleton according to at least some embodiments.
Figure 14B:
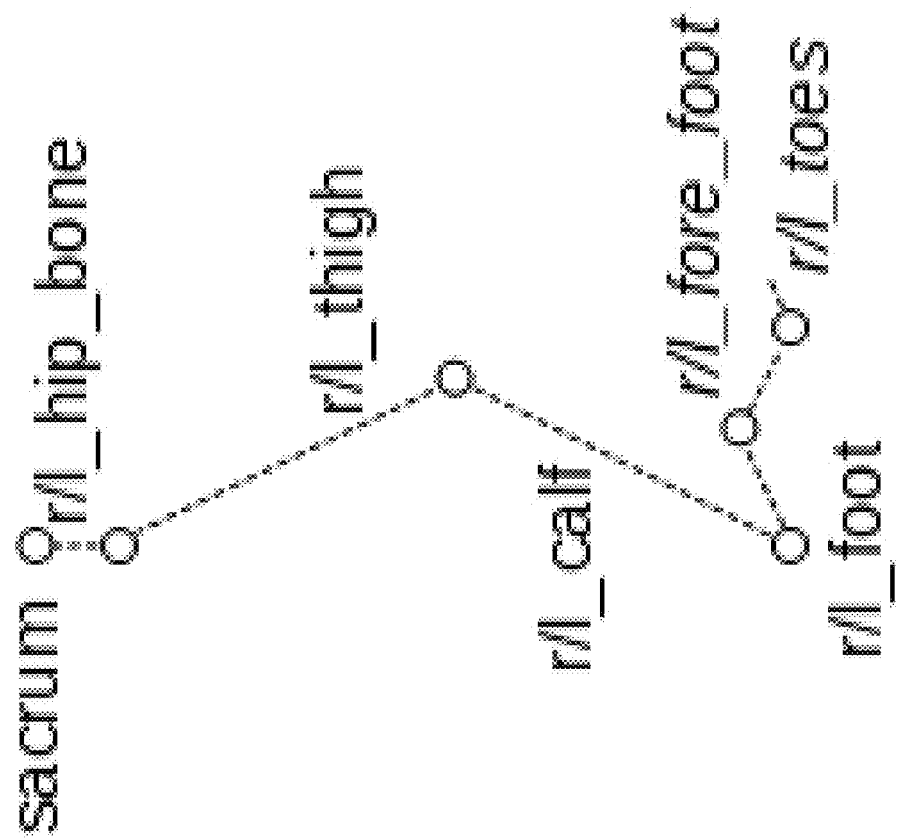
Figure 14C:
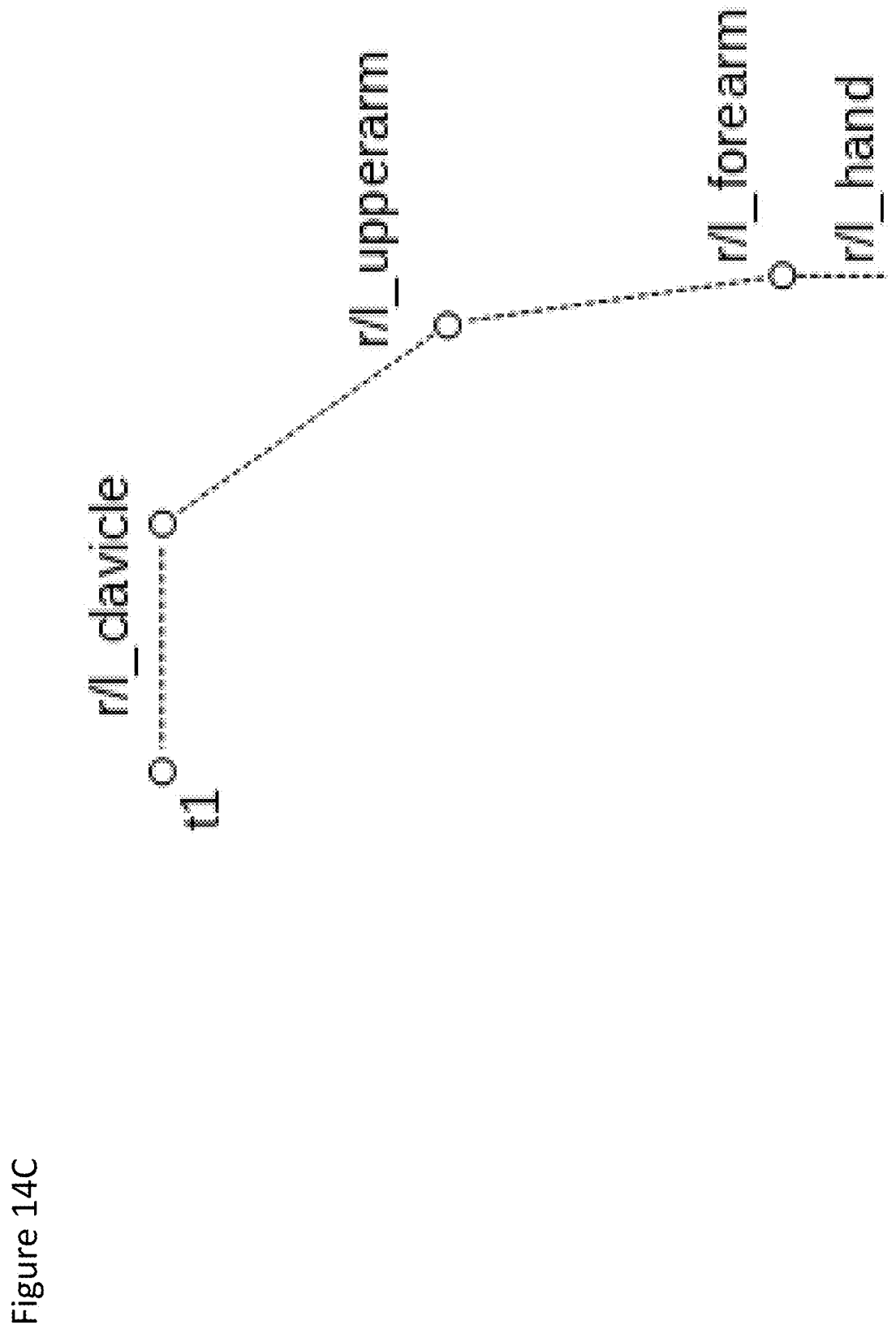
Figure 14D:
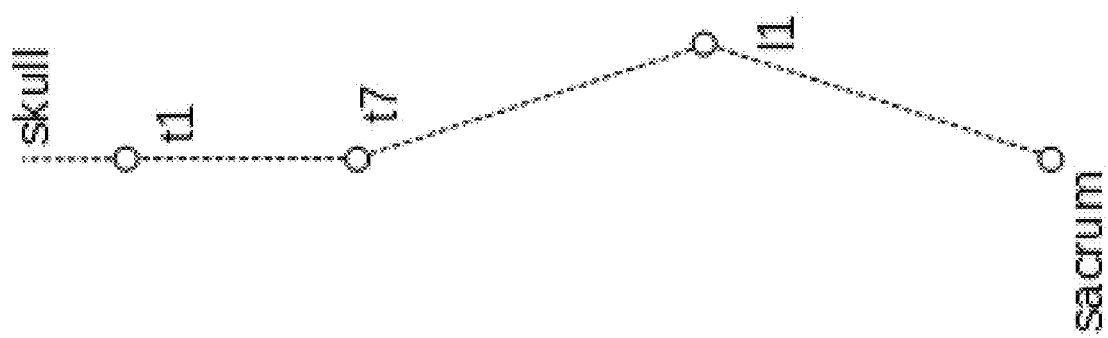
Figure 14E:
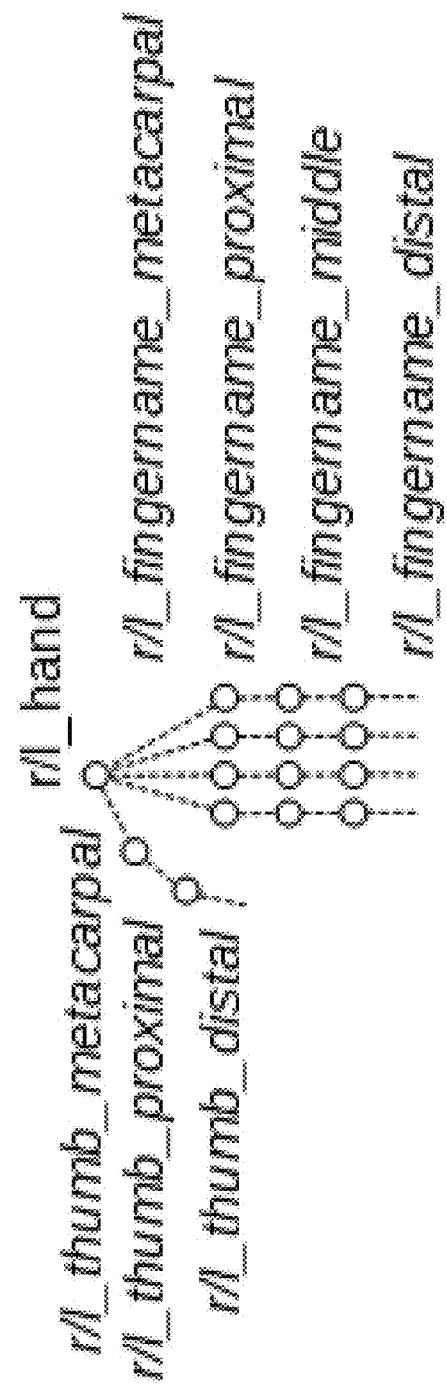
Figure 14F:
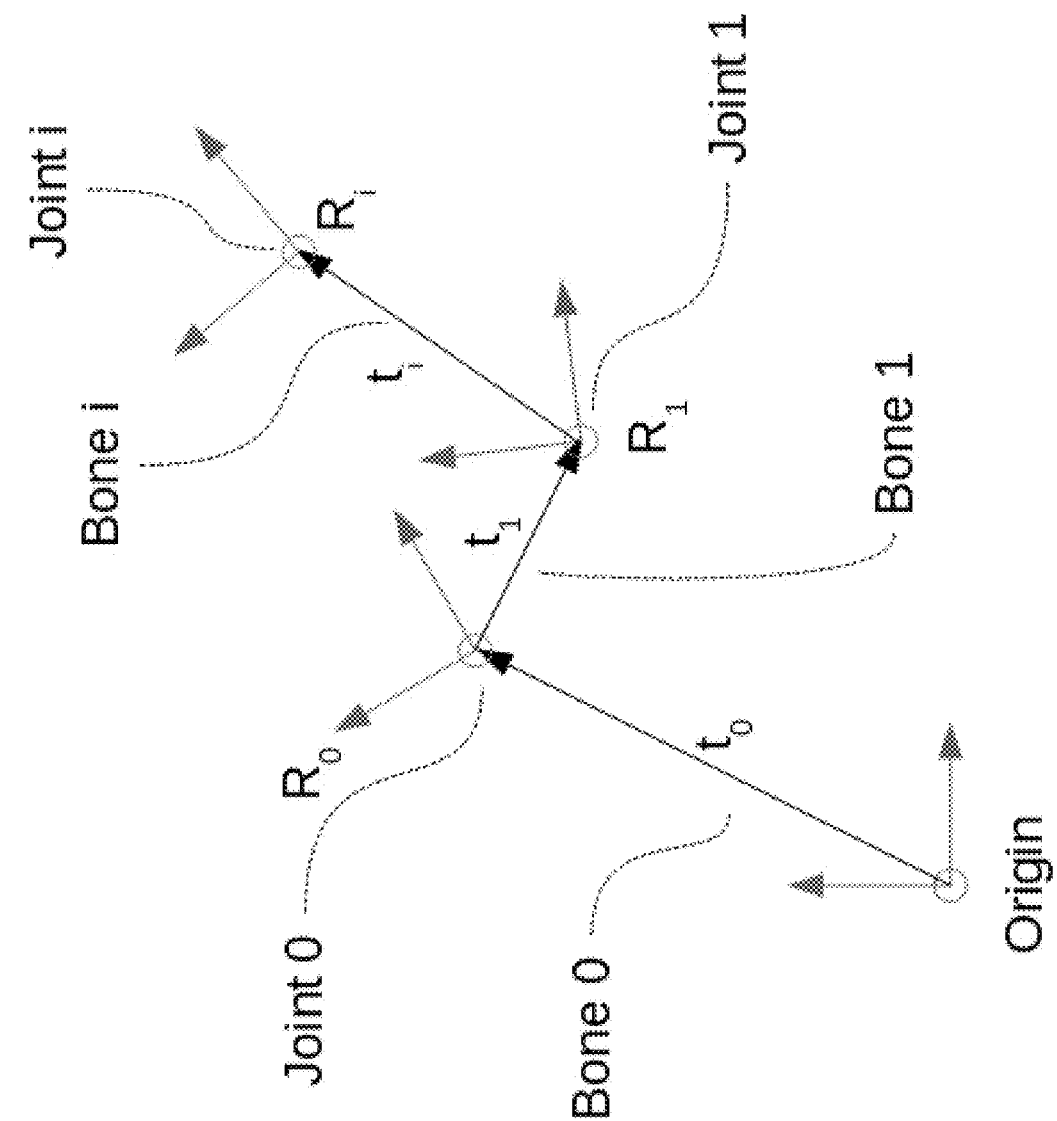
Figure 14G:
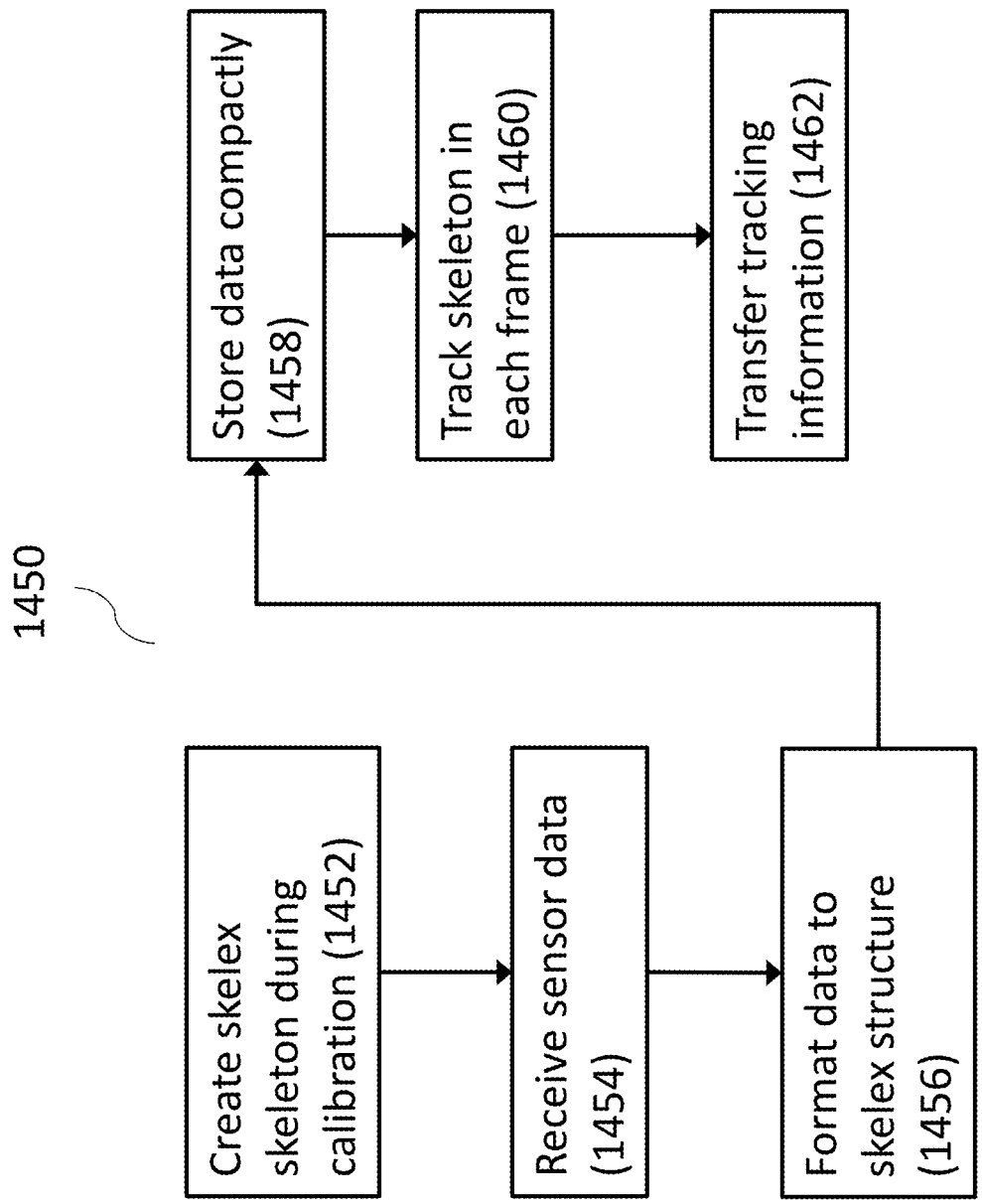

FIGS. 14A-14G relate to a non-limiting implementation for tracking abstraction with a skeleton according to at least some embodiments. FIG. 14A relates to a non-limiting example of a system for tracking abstraction, and FIGS. 14B-14F show an exemplary kinematic chain, joint transforms and pose. FIG. 14G relates to a non-limiting example of a method for implementing same.

In this implementation, but without wishing to be limited, the tracking system uses a Skelex skeleton as the abstract representation for a user body during tracking, to which mesh/skin is added in order to be able to fit the point-cloud to the skelex pose.

Skelex is used as well as a "skeleton data format" in order to exchange data between the system modules (for instance to export the pose to a 3D rendering engine such as Unity 3D during tracking, or to describe a user body scale during calibration). The minimal skelex topology includes the following: left and right legs; backbone (subset of vertebrae) and skull; and left and right arms, without fingers. Optionally, non-minimal vertebrae can be added, as well as left and right-hand fingers.

Turning now to FIG. 14A, there is shown a system 1400, featuring a number of components as previously described. Components with the same number as those previously described have the same or similar function. Device abstraction layer 108 further features a plurality of Skelex components. Analysis components of device abstraction layer 108 are able to access these Skelex components in order to obtain data in a correct format. These components provide a skeleton and pose data exchange system, a format of pose data, i.e. location and orientation in space, a minimal reference for a humanoid skeleton, i.e. joint hierarchy/topology, and utilities for exchange of data between different skeleton types and different data modules.

As shown, skelex device interface 1402 enables data to be provided from various data sources, shown here with the non-limiting examples of markers 118, camera 102, depth sensor 104, and optionally also audio sensor 106 and/or one or more additional sensors 120 as previously described. This data can be formatted in a manner that enables it to be analyzed for tracking the subject as previously described.

Next, a library 1406 enables the data to be formatted to a skelex structure 1408, optionally followed by a serializer 1410. Serializer 1410 can translate the skelex data structure into a format that can be stored more compactly. As a result of the operation of serializer 1410, the data is provided as a binary buffer 1412 (compact set of data bytes following each other memory-wise).

Skeleton tracking data can then be provided in various formats through skelex analysis interface 1404, to data analysis layer 110 and the associated tracking engine 112. Optionally skelex device interface 1402 and skelex analysis interface 1404 are combined to a single interface, for enabling data to be written to, and read from, the skelex structure.

Definitions and notation: Homogeneous coordinates. The following uses homogeneous coordinates, so that a point x is implicitly assumed to be represented as $x:=[x_0, x_1, x_2, 1]^T$.

This allows proper rigid transforms (combination of a translation and a rotation—no reflection) to be expressed in linear form as:

$$R\begin{pmatrix}x_0\\x_1\\x_2\end{pmatrix}+\begin{pmatrix}t_0\\t_1\\t_2\end{pmatrix}=\begin{pmatrix}&&&t_0\\&R&&t_1\\&&&t_2\\0&0&0&1\end{pmatrix}x=T[R\,|\,t]x \quad (24)$$

Rigid transforms can be chained:

$$T[R_1|t_1]T[R_2|t_2]=T[R_1R_2|R_1t_2+t_1] \quad (25)$$

and $$T[R_1|t_1]T[R_2|t_2]\ldots T[R_n|t_n]=T[R^*|t^*] \quad (26)$$

with $$R^*=R_1R_2\ldots R_n \quad (27)$$

and $$t^*=R_1R_2\ldots R_{n-1}t_n+R_1R_2\ldots R_{n-2}t_{n-1}+\ldots+R_1t_2+t_1 \quad (28)$$

Points in space can be described from different frames of reference. One can write $x^V$ the coordinates of a point expressed in the frame of reference V and $T_V^W$ for the rigid transform from the frame of reference V to the frame of reference W. Thus, for example, $$x^W = T_V^W x^V \tag{29}$$

$$[T_V^W]^{-1} = T_W^V \tag{30}$$

With this notation, transforms across several frames of reference can easily be expressed by concatenating transforms and points, by eliminating equal left-hand side subscript and right-hand side superscript. For example $$T_y^x \underbrace{T_z^y p^z}_{zs\ cancel} = \underbrace{T_y^x p^y}_{ys\ cancel} = p^x \tag{31}$$

A skeleton is defined as a rooted tree. Each node (i) of the tree is a transform as described herein that has a single transform of the tree as parent. One can write P(i) the parent of transform i. The root is a special joint that doesn't have a parent joint in the skeleton. The skeleton being a tree, following the parent chain from any node is guaranteed to lead to the root after a finite number of steps. The upward path from a node to the root defines the kinematic chain of that transform. The set of transforms formed by the skeleton can be used to map the physical position and orientation of a human body, by associating a transform to each bone.

FIGS. 14B-14E show exemplary kinematic chains, defined according to the above definitions. FIG. 14B shows a side view of the kinematic chain for the right leg. A similar chain could be created for the left leg. FIG. 14C shows a front view of the kinematic chain for the right arm. A similar chain could be created for the left arm. FIG. 14D shows a side view of the kinematic chain for the skull and backbone. FIG. 14E shows a top view of the kinematic chain for the right hand. A similar chain could be created for the left hand. FIG. 14F shows an exemplary joint transform, defined according to the above definitions.

A non-limiting list of skelex bone components is provided herein: sacrum, l_hip_bone, l_thigh, l_calf, l_foot, l_fore_foot, l_toes, r_hip_bone, r_thigh, r_calf, r_foot, r_fore_foot, r_toes, t1, t7, t1, skull, l_clavicle, l_upperarm, l_forearm, l_hand, r_clavicle, r_upperarm, r_forearm, r_hand, l_thumb_metacarpal, l_thumb_proximal, l_thumb_distal, l_index_metacarpal, l_index_proximal, l_index_middle, l_index_distal, l_middle_metacarpal, l_middle_proximal, l_middle_middle, l_middle_distal, l_ring_metacarpal, l_ring_proximal, l_ring_middle, l_ring_distal, l_pinky_metacarpal, l_pinky_proximal, l_pinky_middle, l_pinky_distal, r_thumb_metacarpal, r_thumb_proximal, r_thumb_distal, r_index_metacarpal, r_index_proximal, r_index_middle, r_index_distal, r_middle_metacarpal, r_middle_proximal, r_middle_middle, r_middle_distal, r_ring_metacarpal, r_ring_proximal, r_ring_middle, r_ring_distal, r_pinky_metacarpal, r_pinky_proximal, r_pinky_middle, r_pinky_distal, 15, 14, 13, 12, t12, t11, t10, t9, t8, t6, t5, t4, t3, t2, c7, c6, c5, c4, c3, c2, c1.

A non-limiting list of skelex bone components is provided herein: //BASE sacrum, pelvis; //LEGS l_thigh, l_calf, l_foot, l_fore_foot, l_toes, r_thigh, r_calf, r_foot, r_fore_foot, r_toes; //SPINAL l1, t7,FIG. 14G relates to a non-limiting, exemplary embodiment of a method for tracking abstraction, by determining a skeleton from the previously described sensor data. As shown, a method 1450 features creating a skelex skeleton during calibration in stage 1452. The sensor data is received in stage 1454 and is formatted to the skelex structure in stage 1456. The data is optionally stored compactly in stage 1458.

Next, the skeleton is processed during each tracking frame, to match the point cloud to at least the location of the vertices of the skeleton, in stage 1460. In stage 1462, the skelex skeleton is transferred to a 3D rendering engine, such as the Unity 3D rendering engine, after each frame.

Without wishing to be limited by a single implementation, for creating such a skeleton as described above, optionally the following design features are included. The skeleton data can be split into 3 levels of information from static information to dynamic information. The skeleton hierarchy will typically be fixed in a given application, and consists of the set of joints, and the parent of each joint.

The skeleton dimensions should be specified if a new user has been calibrated. It consists of the canonical position of each joint in the referential of the parent, and the degrees of freedom and range of motion for each joint.

Pose information is the actual pose data and consists of a transform T W $[R_i|t_i]$ for each joint.

The skeleton preferably has the following features. Any joint should be mappable to a precise anatomical position so that information can be conveyed in a precise manner with medical applications in mind. The skeleton can be a complete skeleton as defined above or a valid subset thereof. A valid subset is defined as including the HumanoidRoot joint, and respecting the skeletal hierarchy, i.e., if i is a parent of j in the subset, then i must be part of j's kinematic chain in the complete skeleton.

Any and all references to publications or other documents, including but not limited to, patents, patent applications, articles, webpages, books, etc., presented in the present application, are herein incorporated by reference in their entirety.

Example embodiments of the devices, systems and methods have been described herein. As noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements from any other disclosed methods, systems, and devices, including any and all elements corresponding to systems, methods and apparatuses/device for tracking a body or portions thereof. In other words, elements from one or another disclosed embodiments may be interchangeable with elements from other disclosed embodiments. In addition, one or more features/elements of disclosed embodiments may be removed and still result in patentable subject matter (and thus, resulting in yet more embodiments of the subject disclosure). Correspondingly, some embodiments of the present disclosure may be patentably distinct from one and/or another reference by specifically lacking one or more elements/features. In other words, claims to certain embodiments may contain negative limitation to specifically exclude one or more elements/features resulting in embodiments which are patentably distinct from the prior art which include such features/elements.

APPENDIX (partial description of a skeleton)

```
# Everything is expressed in world coordinate
ArticulatedModel =
{
    global_scale = 0.80;
    dense_mesh = true;
    bones = (
        {
            name = "sacrum";
            head = [-0.03382374346256256,-0.907242476940155,-0.39482375979423523];
            tail = [-0.03382374346256256,-1.063200831413269,-0.40458834171295166];
            x_axis = [0.999997615814209,-0.000136036542244255554,0.0021727425046265125];
            y_axis = [-2.764863893389702e-10,-0.9980457425117493,-0.06248803436756134];
            z_axis = [0.0021769972518086433,0.062487829476594925,-0.9980433583259583];
            parent = "None";
            ndof = 3;
            initial_theta = [0.0,0.0,0.0];
            offset = [0.0,0.0,0.0];
            active = True;
        },
        {
            name = "l_thigh";
            head = [0.07265270501375198,-0.9023483991622925,-0.3843427300453186];
            tail = [0.11466878652572632,-0.49611833691596985,-0.41821298003196716];
            x_axis = [0.9938485026359558,-0.10558056086301804,-0.03343289718031883];
            y_axis = [0.10252843052148819,0.9912905097007751,-0.08265086263418198];
            z_axis =
[0.04186808317899704,0.07871462404727936,0.996017575263977];
            limit_rotation_x = [-1.5707963705062866,0.7853981852531433];
            limit_rotation_y = [-0.7853981852531433,0.7853981852531433];
            limit_rotation_z = [-0.7853981852531433,0.7853981852531433];
            parent = "sacrum";
            ndof = 3;
            initial_theta = [0.0,0.0,0.0];
            offset =
[0.10647644847631454,0.16085243225097656,0.020245611667633057];
            active = False;
        },
```

What is claimed is:

1. A system for tracking at least a portion of a body, comprising:
 a depth sensor for providing data to determine a three-dimensional location of the body in space according to a distance of the body from the depth sensor;
 a body model, comprising a skeleton template having a hierarchical data structure of joint information and vertex information; and
 a computational device comprising a memory and one or more processors having computer instructions operating thereon configured to:
  fit data points from the depth sensor to the body model according to a probabilistic fitting algorithm, wherein a plurality of data points is identified as super points and are given additional weight in the fitting algorithm, said super points are defined according to an object attached to the body, the data points are identified with joints of the body or a combination thereof, and said probabilistic fitting algorithm is constrained according to at least one constraint defined by the body; and
  perform a defined set of basic operations in response to receiving a corresponding basic instruction selected from a defined native instruction set of codes; and
 wherein said computer instructions comprise:
  a first set of machine codes selected from the native instruction set to identify the plurality of data points as super points;
  a second set of machine codes selected from the native instruction set to identify the data points with joints of the body, according to said super points or a combination thereof; and
  a third set of machine codes selected from the native instruction set to perform the constrained probabilistic fitting algorithm.

2. The system of claim 1, wherein the computer instructions are configured to cause the processor to operate as a calibration module configured to calibrate the system according to removal of an inanimate object.

3. The system of claim 2, wherein said inanimate object comprises a table which is segmented out of the tracking of the point cloud.

4. The system of claim 1, further comprising a plurality of templates, wherein the computer instructions are further configured to cause the processor to initialize a template of the plurality of templates, wherein the template features a model of a human body configured only as a plurality of parameters, only as a plurality of features, or both.

5. The system of claim 4, wherein the plurality of parameters and/or features include a skeleton, and one or more joints.

6. The system of claim 5, wherein instructions are additionally configured to cause the processor to utilize the plurality of parameters and/or features to assist in tracking of the user's movements.

7. The system of claim 4, wherein the computer instructions are configured to map the sensor data onto a GMM (Gaussian mixture model); wherein the body model includes a sparse-skin representation; and wherein the instructions are additionally configured to cause the processor to suppress corresponding gaussians.

8. The system of claim 7, wherein data is mapped to a GMM by a classifier.

9. The system of claim 7, wherein: the tracking engine includes a template engine configured to read a template from a template database, and the computer instructions are additionally configured to cause the processor to operate as a GMM mapper, and to send the template to the GMM mapper; and wherein instructions are additionally configured to cause the processor to operate as a point cloud decomposer, and to enable the GMM mapper to receive point cloud information therefrom.

10. The system of claim 9, wherein the computer instructions are configured to apply Kalman filter to determine a pose of the user.

11. The system of claim 1, wherein said constraint is selected from the group consisting of a constraint against self-intersection, an angle constraint and a pose prior constraint.

12. The system of claim 11, wherein said data points identified with joints of the body are identified according to a previously determined position as an estimate.

13. The system of claim 11, wherein said object attached to the body comprises one or more of active markers that provide a detectable signal, or a passive object that is so attached.

14. The system of claim 13, wherein said object comprises headgear or a smart watch.

15. The system of claim 11, wherein the body model comprises a template, said template including a standard model of a skeleton and skinning.

16. The system of claim 15, wherein said template is adjusted as an input to the body model; and wherein said probabilistic fitting algorithm comprises a GMM (Gaussian mixture model) for mapping the data points to the body model.

17. The system of claim 15, wherein said template including a standard model of a skeleton according to a hierarchy of joints as vertices and skinning, and a first determination of a position of said joints of the body are determined according to said template.

18. The system of claim 15, wherein:
for a given joint, the angle constraints are determined according to a rotational model, for determining 1, 2 or 3 degrees of freedom, and for each degree of freedom, a minimum and maximum angle is determined.

19. The system of claim 1, further comprising a camera, and wherein the one or more processors having computer instructions operating thereon are further configured to cause the processor to fit data points from at least one of the camera and the depth sensor relative to a user.

20. The system of claim 19, wherein:
the camera is configured to collect video data of one or more movements of the user in an environment via optionally a plurality of markers affixed to points on the user's body, the depth sensor is configured to provide at least one of: data to determine the three-dimensional location or position of a user, or a combination thereof, in the environment according to a distance(s) of one or more of the markers from depth sensor in the volume; and TOF (time of flight) data; and the instructions are additionally configured to cause the processor to combine the data from the depth sensor with the video data from the camera to produce a three-dimensional map of the user in an environment of the user.

21. The system of claim 20, wherein each marker comprises either an active or passive sensor.

22. The system of claim 21, wherein at least one of the markers includes an inertial sensor.

23. The system of claim 21, wherein each marker comprises an active optical marker for emitting light.

24. The system of claim 23, wherein the computer instructions include instructions configured to cause the processor to perform as a calibration module configured to calibrate the system according to tracking one or more active markers.

25. The system of claim 21, further comprising an orientation sensor for determining an orientation of the camera, wherein the computer instructions are additionally configured to cause the processor to combine the data from the depth sensor with the video data from the camera according to the orientation of the camera.

26. The system of claim 25, further comprising one or more additional sensors, wherein at least one of the one or more additional sensors are configured to collect biological signals of the user.

27. The system of claim 26, wherein at least one of the one or more sensors comprise an inertial sensor.

28. The system of claim 26, wherein the computer instructions are additionally configured to cause the processor to convert sensor signals to sensor data which is sensor-agnostic.

29. The system of claim 26, wherein the computer instructions are additionally configured to cause the processor to clean signals by either removing or at least reducing noise, and or normalizing the signals, and wherein the computer instructions are additionally configured to cause the processor to perform data analysis on the sensor data, wherein said data analysis comprises performing instructions as a tracking engine.

30. The system of claim 29, wherein the tracking engine is configured to either track the position of the user's body, track the position of one or more body parts of the user, including but not limited, to one or more of arms, legs, hands, feet, and head, or both.

31. The system of claim 30, wherein the tracking engine is configured to decompose signals representing physical actions made by the user into data representing a series of gestures.

32. The system of claim 31, wherein the tracking engine is configured to decompose signals representing physical actions made by the user into data representing a series of gestures via classifier functionality.

33. A system for tracking at least a portion of a body, comprising:
a depth sensor for providing data to determine the three-dimensional location of the body in space according to the distance from depth sensor;
a body model, comprising a skeleton; and
a computational device having computer instructions operating thereon configured to fit data points from the depth sensor to a body model according to a probabilistic fitting algorithm, wherein
said probabilistic fitting algorithm is constrained according to at least one constraint defined by the human body, said constraint being selected from the group consisting of a constraint against self-intersection, an angle constraint and a pose prior constraint,
the body model comprises a template, said template including a standard model of a skeleton and skinning,
said template is adjusted as an input to the body model; and wherein said probabilistic fitting algorithm comprises a GMM (Gaussian mixture model) for mapping the data points to the body model.

34. The system of claim 33, further comprising:
a camera configured to collect video data of one or more movements of the user in an environment via optionally a plurality of markers affixed to points on the user's body; and
wherein the depth sensor is configured to provide at least one of (a) data to determine a three-dimensional location or position of a user or a combination thereof in the environment according to one or more distances of one or more of the markers from depth sensor in the volume and (b) TOF (time of flight) data; and the computer instructions are additionally configured to cause the processor to combine the data from the depth sensor with the video data from the camera to produce a three-dimensional map of the user in the environment.

35. A method for tracking at least a portion of a body, comprising:
determining an initial position of the body using a depth sensor;
receiving sensor data from the depth sensor, the sensor data comprising data points;
defining a plurality of the data points as super points, each super point identified with an object attached to the body, a joint of the body, or a combination thereof;
retrieving, from a memory of a memory storage device, one or more groups of data, each group of data representing a body model template, each body model template according to a hierarchy of joints as vertices and skinning;
fitting a plurality of the data points to a body model using a probabilistic fitting algorithm in which each super point is given additional weight;
mapping sensor data as a point cloud to a Gaussian mixture model (GMM); and
imposing constraints on the GMM;
wherein the imposing constraints comprises scaling one or more distances between a first data point and a second data point according to the distance between the first data point and a third data point and a predetermined scale ratio.

* * * * *